United States Patent [19]
Orimo et al.

[11] Patent Number: 5,708,535
[45] Date of Patent: Jan. 13, 1998

[54] LENS MIRROR CYLINDER HAVING TWO MOVABLE LENSES AND A DIAPHRAGM UNIT

[75] Inventors: Shinichi Orimo, Tokyo; Kenji Hirano, Chiba; Toshifumi Takaoka, Chiba; Kunio Nakazato, Chiba; Ryosuke Tsuru, Tokyo, all of Japan

[73] Assignee: Sony Corporation, Japan

[21] Appl. No.: 611,672

[22] Filed: Mar. 6, 1996

[30] Foreign Application Priority Data

Mar. 9, 1995 [JP] Japan .................. 7-050210

[51] Int. Cl.⁶ .................. G02B 15/14; G02B 7/02
[52] U.S. Cl. .................. 359/823; 359/822; 359/696
[58] Field of Search .................. 359/813, 814, 359/822, 826, 696; 369/44.14

[56] References Cited

U.S. PATENT DOCUMENTS

| | | | |
|---|---|---|---|
| 4,568,142 | 2/1986 | Iguma | 359/823 |
| 4,608,676 | 8/1986 | Yoshida | 369/32 |
| 4,660,190 | 4/1987 | Fujii | 369/44 |
| 4,706,232 | 11/1987 | Funada | 369/13 |
| 4,920,420 | 4/1990 | Sano et al. | 358/227 |
| 5,109,368 | 4/1992 | Ohta | 369/44.14 |
| 5,541,777 | 7/1996 | Sakamoto | 359/824 |

*Primary Examiner*—David C. Nelms
*Assistant Examiner*—Ricky Mack
*Attorney, Agent, or Firm*—Ronald P. Kananen

[57] ABSTRACT

A lens mirror cylinder having first and second movable lens structures, constructed by assembling in a mirror cylinder a plurality of magnetic circuit means arranged on the outer periphery side of the second movable lens structure, guided so that it can move in the light axis direction of the lens, so as to face each other across the light axis, a first lens driving means for driving the first movable lens structure arranged at a position on the outer periphery side of the second movable lens structure in which the magnetic circuits are not arranged, and a lens diaphragm unit. By this construction, the space of the lens mirror cylinder can be effectively utilized, and a reduction of size of the lens mirror cylinder and the camera using the lens mirror cylinder is realized.

21 Claims, 10 Drawing Sheets

LENS MIRROR CYLINDER HAVING TWO MOVABLE LENSES AND A DIAPHRAGM UNIT

BACKGROUND OF THE INVENTION

1. Field of the Invention

The present invention relates to a lens mirror cylinder provided in a video camera, a still camera, etc., more particularly it relates to a lens mirror cylinder provided with a movable lens structure supported inside the mirror cylinder by a guide shaft or the like so that it can freely move, a lens driving means for driving this movable lens structure in the light axis direction, and a diaphragm unit for controlling the amount of light incident upon the mirror cylinder.

2. Description of the Related Art

A video camera, for example, is provided with an auto-focus mechanism for automatically performing the focusing with respect to a photographic object and a motorized zoom mechanism for changing the magnification. This auto-focus mechanism and motorized zoom mechanism are constituted by a lens mirror cylinder provided with a focus lens structure and a zoom lens structure which are supported in an internal portion of the mirror cylinder by a guide means such as a guide shaft so that it can freely move in the light axis direction and, at the same time, driven to work by the driving means.

The focus lens structure or the zoom lens structure is constituted by a group of focus lenses or a group of zoom lenses each comprising one or a plurality of lenses and a lens holder in which these lens groups are installed. Further, in the lens holder, a bearing portion through which the guide shaft provided in the mirror cylinder penetrates is integrally formed. The focus lens structure or the zoom lens structure is moved in the light axis direction along the guide shaft by the lens driving means.

The lens driving means of the zoom lens structure determines the wide angle end and Tele end of the lens system of the video camera and makes the zoom lens structure move in the mirror cylinder with a large amount of movement. Accordingly, the lens driving means of this zoom lens structure is generally constituted by a zoom lens driving unit which uses a stepping motor as the drive source and is provided with a rotation-to-linear motion conversion mechanism converting the rotational motion of this stepping motor to linear motion. The zoom lens driving unit is installed in the mirror cylinder and engaged with an engagement portion integrally formed in the lens holder so that a driver constituting the rotation-to-linear motion conversion mechanism faces the internal portion of the mirror cylinder from the guide groove provided in this mirror cylinder.

On the other hand, the lens driving means of the focus lens structure moves the focus lens structure along the light axis with a good response so as to form the photographic image on the photographing plane of the CCD solid-state camera element arranged at a rear end of the mirror cylinder. For this reason, the lens driving means of the focus lens structure is generally constituted by a linear motor. The linear motor included a coil integrally combined with the focus lens structure, a yoke body having a substantially cylindrical shape arranged on the mirror cylinder side and magnets joined and fixed to the yoke pieces of this yoke body.

The linear motor is constituted so that a magnetic flux is generated between the coil and yoke corresponding to the direction of the driving current by the supply of the driving current to the coil in response to control output from the control unit. This magnetic flux generates a magnetic driving force moving the focus lens structure in the light axis direction along the guide shaft. Accordingly, the focus lens structure is driven to move inside the mirror cylinder in the light axis direction by this magnetic driving force and forms the photographic image on the photographing plane of the CCD solid-state camera element.

The lens mirror cylinder is provided with a lens position detection means for detecting a reference position so as to precisely move the zoom lens structure or the focus lens structure in the mirror cylinder. For example the lens position detection means of the zoom lens structure include a lens position detection piece integrally formed in the lens holder of this zoom lens structure and a lens position detection sensor comprising a light emitting diode and a light receiving element arranged on the mirror cylinder side while sandwiching the movement region of this lens position detection piece therebetween. The lens position detection means transmits the detection output to the control unit when the zoom lens structure is driven by the driving means and the lens position detection pieces pass between the light emitting diode and the light receiving element.

Further, the lens position detection means of the focus lens structure include an MR magnet arranged in the lens holder and the lens position detection sensor mounted on the sensor holder arranged while being positioned at the rear end portion of the mirror cylinder. Namely, at the lens holder, an arm-like magnet attachment portion is integrally protected so as to come into close contact with the inner surface of the mirror cylinder from the outer periphery. The MR magnet is attached to this magnet attachment portion so as to face the inner surface of the mirror cylinder. The MR magnet is alternately magnetized between the N pole and S pole in the light axis direction.

The lens position detection sensor is provided so as to face the movement region of the MR magnet of the lens holder while being positioned at the rear end of the mirror cylinder defining the reference position of the focus lens structure. The focus lens structure is actuated by the MR magnet to which the lens position detection sensor is confronted in a state where it is positioned at the rear end in the mirror cylinder and transmits the detection output of the reference position. This detection output is transmitted to the control unit where detection of the reference position of the focus lens structure is carried out. The lens position detection sensor detects the N pole and the S pole according to the passing of the FIR magnet when the focus lens structure moves and transmits the detection output to the control unit. The control unit counts the transmitted detection output and transmits an output to the lens driving means for moving the focus lens structure from the reference position to the predetermined position.

The lens mirror cylinder is provided with an automatic diaphragm device for reproducing the photographic object with a proper exposure. This automatic diaphragm device includes a so-called auto-iris which extracts an average value or a peak value of the video signal output, drives a plurality of diaphragm leaves, and automatically adjusts the aperture of the mirror cylinder so as to obtain a proper exposure. The automatic diaphragm device includes a diaphragm body accommodating a plurality of diaphragm leaves and a drive control unit including an actuator driving these diaphragm leaves and a control unit.

Video cameras, however, are required to be reduced in size, reduced in weight, improved in quality of image, increased in number functions, and reduced in cost. Further it has become important that they also appear compact in outer appearance and be easy to operate. These conditions of video cameras require that the lens mirror cylinder to be mounted on a camera be constructed so that the constituent members are all accommodated within the dimensions of the cylinders outermost diameter and that no excessive unevenness be generated. The lens mirror cylinder is frequently arranged in the corner of the video camera due to the requirements of design or ease of operation and so an otter appearance free from unevenness is extremely important.

OBJECT AND SUMMARY OF THE INVENTION

Accordingly, a first object of the present invention is to provide a lens mirror cylinder provided with a first movable lens structure, a second movable lens structure, a and an automatic diaphragm device which are moved inside the mirror cylinder which has no unevenness as a whole and is reduced in size and reduced in weight. This is accomplished by achieving greater efficiency in the use of the available space by including in the second lens driving means driving a second movable lens housing a linear motor comprising at least magnetic circuits arranged at positions facing each other sandwiching the light axis therebetween and, at the same time, positioning the drive source of the first movable lens structure and the drive control unit of the automatic diaphragm device in a space in which the efficiency is enhanced.

Further, a second object of the present invention is to provide a lens mirror cylinder which achieves a reduction of size and a reduction of weight by including the lens driving means moving the movable lens structure to be moved inside the mirror cylinder in the light axis direction a linear motor comprising at least magnetic circuits arranged at the positions facing each other while sandwiching the light axis therebetween.

According to a first aspect of the present invention, there is provided a lens mirror cylinder having first and second movable lens structures. The lens mirror cylinder includes a mirror cylinder provided with a lens guide means in a light axis direction; a first movable lens structure which is provided with a first lens holder in which a movable lens is installed and is supported inside the mirror cylinder by the lens guide means so that it can freely move in the light axis direction; a second movable lens structure which is provided with a second lens holder in which the movable lens is installed and is supported inside the mirror cylinder by the lens guide means so that it can freely move in the light axis direction; a first lens driving means which has a drive source and a lens driving member connected to the first movable lens structure and, at the same time, driven by the drive source to move the first movable lens structure in the light axis direction and which is installed in the mirror cylinder; a diaphragm unit which comprises a diaphragm body arranged in the mirror cylinder and controlling the aperture and a drive control unit driving this diaphragm body and which is installed in the mirror cylinder; and a second lens driving means which includes a linear motor comprised by a coil, a yoke comprised of an inside yoke piece penetrating through a center hole of this coil, an outside yoke piece extending to the outer periphery of the coil, and a base connecting base ends of these inside yoke piece and outside yoke piece, and a magnet forming a closed magnetic path between the yoke pieces of this yoke and the base, which is arranged inside the mirror cylinder, and which drives the second movable lens structure to move in the light axis direction, the second lens driving means being constructed by arranging a pair of yokes facing each other on the two sides of the light axis of the lens while sandwiching the coil therebetween and, at the same time, the first lens driving means and the diaphragm unit being installed in the mirror cylinder while positioning the drive source and the drive control unit at positions orthogonal to the positions of arrangement of these yokes.

Preferably, the linear motor constituting the second lens driving means is constituted by integrally forming a coil portion in the second lens holder and, at the same time, arranging a pair of yokes positioned on the two sides facing each other sandwiching this coil portion therebetween.

Alternatively, the linear motor constituting the second lens driving means may be constructed by integrally forming a coil by winding it around the second rectangular lens holder and, at the same time, arranging a pair of yokes positioned facing each other across the light axis of the lens.

Preferably, in this case, the diaphragm unit and/or the first lens driving means are arranged on the surface of the second rectangular lens holder on which a pair of yokes is not arranged.

Preferably, the electrical connection between the diaphragm unit and/or the first lens driving means and the main apparatus which is provided with the drive control unit and/or the drive source and the lens mirror cylinder is made by a flexible cable which is directly soldered.

Preferably, a support rib supporting the outer periphery of the drive source of the first lens driving means and/or the drive control unit of the diaphragm unit is integrally formed in the mirror cylinder.

Preferably, the first movable lens structure is a zoom lens structure, and the second movable lens structure is a focus lens structure.

Preferably, the first and second movable lenses are include one or a combination of a plurality of lenses.

According to a second aspect of the present invention, there is provided a lens mirror cylinder including a mirror cylinder provided with a lens guide means in the light axis direction; a movable lens structure which includes one or a plurality of movable lenses and the lens holder in which this movable lens is installed and which is supported inside the mirror cylinder by the lens guide means so that it can freely move in the light axis direction; and a linear motor which includes a coil, a yoke composed of an inside yoke piece penetrating through a center hole of this coil, an outside yoke piece extending to the outer periphery of the coil, and a base connecting base ends of the inside yoke piece and the outside yoke piece, and a magnet forming a closed magnetic path between the yoke pieces of this yoke and the base, which is arranged inside the mirror cylinder, and which drives the movable lens structure to move in the light axis direction, the coil portion being integrally formed in the lens holder of the movable lens structure and, at the same time, a pair of yokes arranged on the two sides facing each other sandwiching the light axis of the lens therebetween.

Preferably, the linear motor is constructed by integrally forming a coil by winding it around the lens holder of the movable lens structure and, at the same time, arranging a pair of yokes positioned on the two sides facing each other sandwiching the light axis of the lens therebetween.

Preferably, the movable lens of the movable lens structure is a focus lens.

According to a third aspect of the present invention, there is provided a lens mirror cylinder comprising a mirror cylinder provided with a lens guide means in a light axis direction; a first movable lens structure which is provided with a first lens holder in which the movable lens is installed and which is supported inside the mirror cylinder by the lens guide means so that it can freely move in the light axis direction; a second movable lens structure which is provided with a second lens holder in which the movable lens is installed and which is supported inside the mirror cylinder by the lens guide means so that it can freely move in the light axis direction; a first lens driving means which has a drive source and a lens driving member connected to the first movable lens structure and, at the same time, driven by the drive source to move the first movable lens structure in the light axis direction and which is installed in the mirror cylinder; a diaphragm unit which includes a diaphragm body arranged in the mirror cylinder and controlling the aperture and a drive control unit driving this diaphragm body and which is installed in the mirror cylinder; and a second lens driving means which includes a plurality of magnetic circuits on the outer periphery side of the second movable lens structure except at a predetermined range, the first lens driving means and the diaphragm unit being installed in the mirror cylinder while positioning the drive source and the drive control unit on the outer periphery side of the second movable lens structure in which the magnetic circuit is not arranged.

Preferably, the magnetic circuit in the second lens driving means includes a coil, a yoke composed of an inside yoke piece penetrating through a center hole of this coil, an outside yoke piece extending to the outer periphery of the coil, and a base connecting base ends of the inside yoke piece and the outside yoke piece, and a magnet forming a closed magnetic path between the yoke pieces of this yoke and the base, which is arranged inside the mirror cylinder, and which drives the second movable lens structure to move in the light axis direction.

Preferably, the linear motor constituting the second lens driving means is constructed by integrally forming a coil by winding it around the second rectangular lens holder and, at the same time, a pair of yokes are arranged positioned at the two sides facing each other over the light axis of the lens.

Preferably, the first movable lens structure is a zoom lens structure, and the second movable lens structure is a focus lens structure.

BRIEF DESCRIPTION OF THE DRAWINGS

These and other objects and features of the present invention will become clearer from the following description of the preferred embodiments made with reference to the attached drawings, in which.

DETAILED DESCRIPTION OF THE PREFERRED EMBODIMENTS

Before describing the preferred embodiments in detail, a more detailed explanation will be given of the related art, with reference to the drawings, for background purposes.

Figure 1:
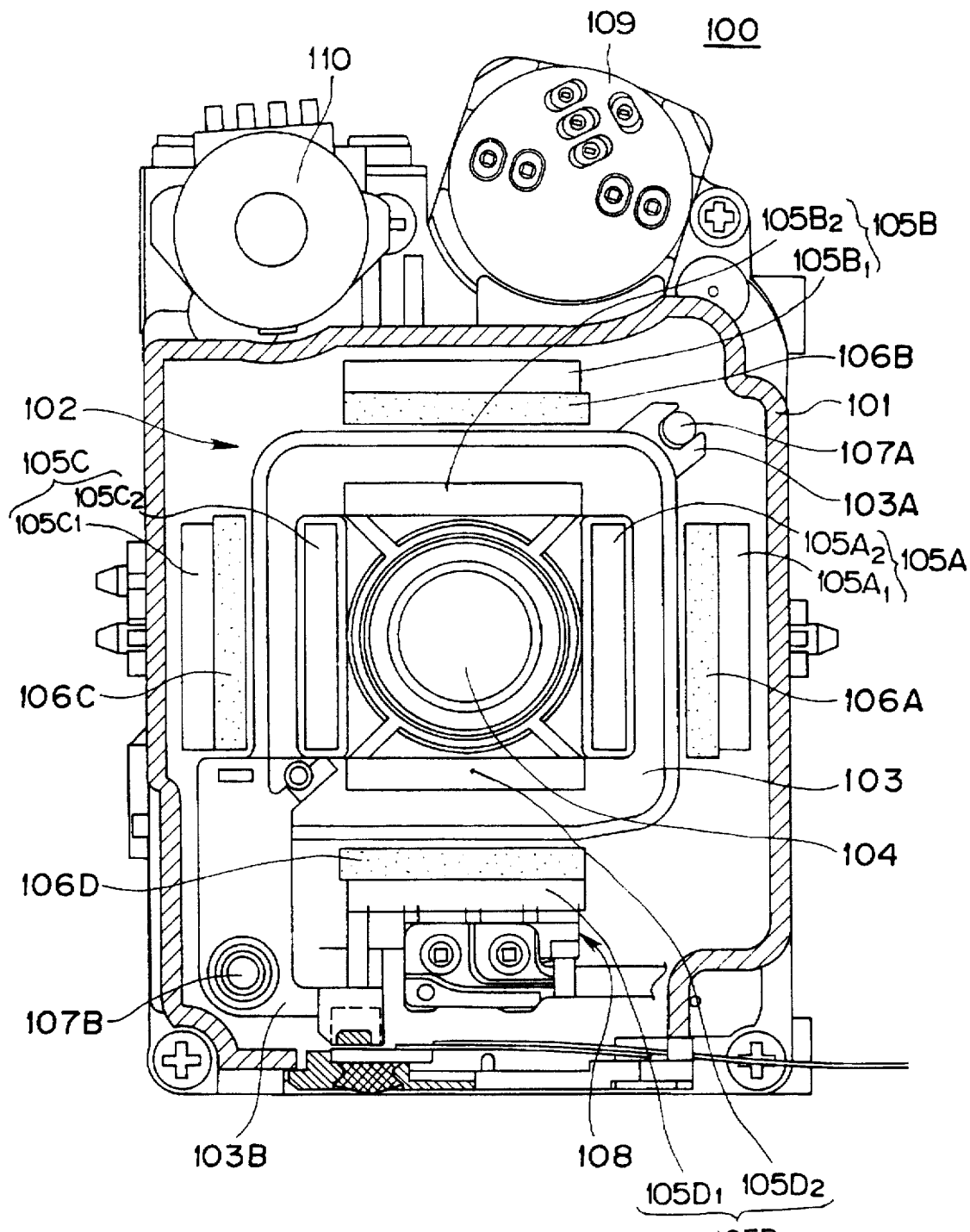
FIG. 1 is a vertically sectional view o principal parts explaining the constitution of an internal portion of a lens mirror cylinder of the related art.

FIG. 1 is a view showing a focus lens driving mechanism for an example of a lens mirror cylinder 100 for a video camera. The lens mirror cylinder 100 is provided with a mirror cylinder 101 formed in a square cylindrical shape; a focus lens structure 102 comprising a lens holder 103 for accommodating the focus lens 104 therein; and a linear motor including a focus lens driving means which includes a yoke 105, a magnet 106, and a not illustrated coil arranged on the back surface of the lens holder 103 by moving the focus lens structure 102 in the light axis direction.

The lens holder 103 of the focus lens structure 102 has a rectangular frame with which a cylinder accommodating the focus lens 104 is integrally formed at the center and, at the same time, a not illustrated coil of the linear motor is integrally combined on the back surface. In the lens holder 103, a first bearing portion 103A and a second bearing portion 103B are integrally projected at the corners of the outer periphery facing each other. Through the first bearing portion 103A and the second bearing portion 103B, guide shafts 107A and 107B supported and bridged in the mirror cylinder 101 are respectively disposed.

The yoke 105, which constitutes part of the linear motor, is comprised of a first yoke 105A through a fourth yoke 105D respectively arranged while being positioned on the outer periphery of the not illustrated coil. The first yoke 105A through the fourth yoke 105D are formed in the same shape, respectively, and exhibit a substantially squared U-shape comprising outside yoke pieces 105A1 through 105D1 respectively extended while being in close contact with the outer periphery of the coil, inside yoke pieces 105A2 through 105D2 penetrating through the center hole of the coil, and a base portion which connects the base ends of these outside yoke pieces and inside yoke pieces and, at the same time, is fixed to the mirror cylinder 101.

The outside yoke pieces 105A1 through 105D1 and the inside yoke pieces 105A2 through 105D2 have a length extending at least as far as the range of movement of the focus lens structure 102. To the outside yoke pieces 105A1 through 105D1, plate-like magnets 106A through 106D are joined and affixed to the surface facing the outer periphery of the coil. Note that, in the space beneath of the mirror cylinder 101, a terminal portion 108 of the coil is positioned.

The yoke 105 and the magnet 106 constitute a closed magnetic circuit of an outside yoke piece—magnet—inside yoke piece—base—outside yoke piece. Accordingly, in the linear motor, when a driving current is supplied to the coil, a magnetic flux in accordance with the direction of this driving current is generated and is made to act upon the closed magnetic circuit. The focus lens structure 102 is moved in the light axis direction by the magnetic driving force generated by the magnetic flux while being supported by the closed magnetic circuit and the guide shaft 107. This performs the focus control.

The lens mirror cylinder 100 is provided with, in addition to the focus lens structure 102, a zoom lens structure comprising a zoom lens and a zoom lens holder, a zoom lens driving unit driving this zoom lens structure, and an automatic diaphragm device, not illustrated. Although a detailed description is omitted, the zoom lens driving unit is constituted by a stepping motor 110 serving as the drive source, a bracket member with which this stepping motor 110 is assembled, a screw shaft which is rotatably supported and bridged by this bracket member and, at the same time, has a length equal to the range of movement of the zoom lens structure, and having a screw formed on the outer periphery thereof, a guide shaft supported and bridged by the bracket member in parallel to this feed screw shaft and driver, etc.

In the zoom lens driving unit, the driver is made to face the interior of the mirror cylinder 101 from the guide groove formed in the mirror cylinder 101 over the entire area of the movement region of the zoom lens structure and is engaged with the zoom lens structure. Further, the zoom lens driving unit is accommodated in the mirror cylinder 101 while closing the guide groove. Accordingly, in the lens mirror cylinder 100, the stepping motor 110 of this zoom lens driving unit is projected and exposed from the upper surface of the mirror cylinder 101.

The automatic diaphragm device includes a diaphragm body in which a plurality of diaphragm leaves are accommodated and which is arranged inside the mirror cylinder 101 and a drive control unit 109 including an actuator for driving these diaphragm leaves and a control unit. The diaphragm body has an outer diameter of a dimension almost equal to the aperture of the mirror cylinder 101. Accordingly, in the lens mirror cylinder 100, the drive control unit 109 of this automatic diaphragm device is projected and exposed from the upper surface of the mirror cylinder In the lens mirror cylinder 100 constituted as described above, a yoke 105 for forming the closed magnetic circuit is arranged over almost the entire circumference of the focus lens structure 102, and the outer diameter dimension of the mirror cylinder 101 becomes large so as to provide space for these yokes 105. Thus there is a problem in that the achievement of a reduction of size is extremely difficult. Further, the lens mirror cylinder 100 becomes heavy as a whole due to the weight of the yoke 105, so there also exists a problem that the achievement of a reduction of weight is extremely difficult.

Further, the lens mirror cylinder 100 exhibits an outer shape having unevenness as a whole since the drive control unit 109 of the automatic diaphragm device and the stepping motor 110 of the zoom lens driving unit are projected and exposed from the outer periphery of the mirror cylinder 101. This present the problem of lowering of the space efficiency of the attachment portion on the video camera body side and preventing the reduction of size.

Furthermore, the lens mirror cylinder 100 is frequently arranged in the vicinity of the portion for carrying the video camera for the purpose of ease of operation, so there is a problem in that the drive control unit 109 of the automatic diaphragm device and the stepping motor 110 of the zoom lens driving unit projected from the mirror cylinder 101 are strongly pressed or squeezed by the user. This can deform the lens mirror cylinder 100 and lead to malfunctions.

Below, a specific embodiment of the present invention will be explained by referring to the drawings.

Figure 2:
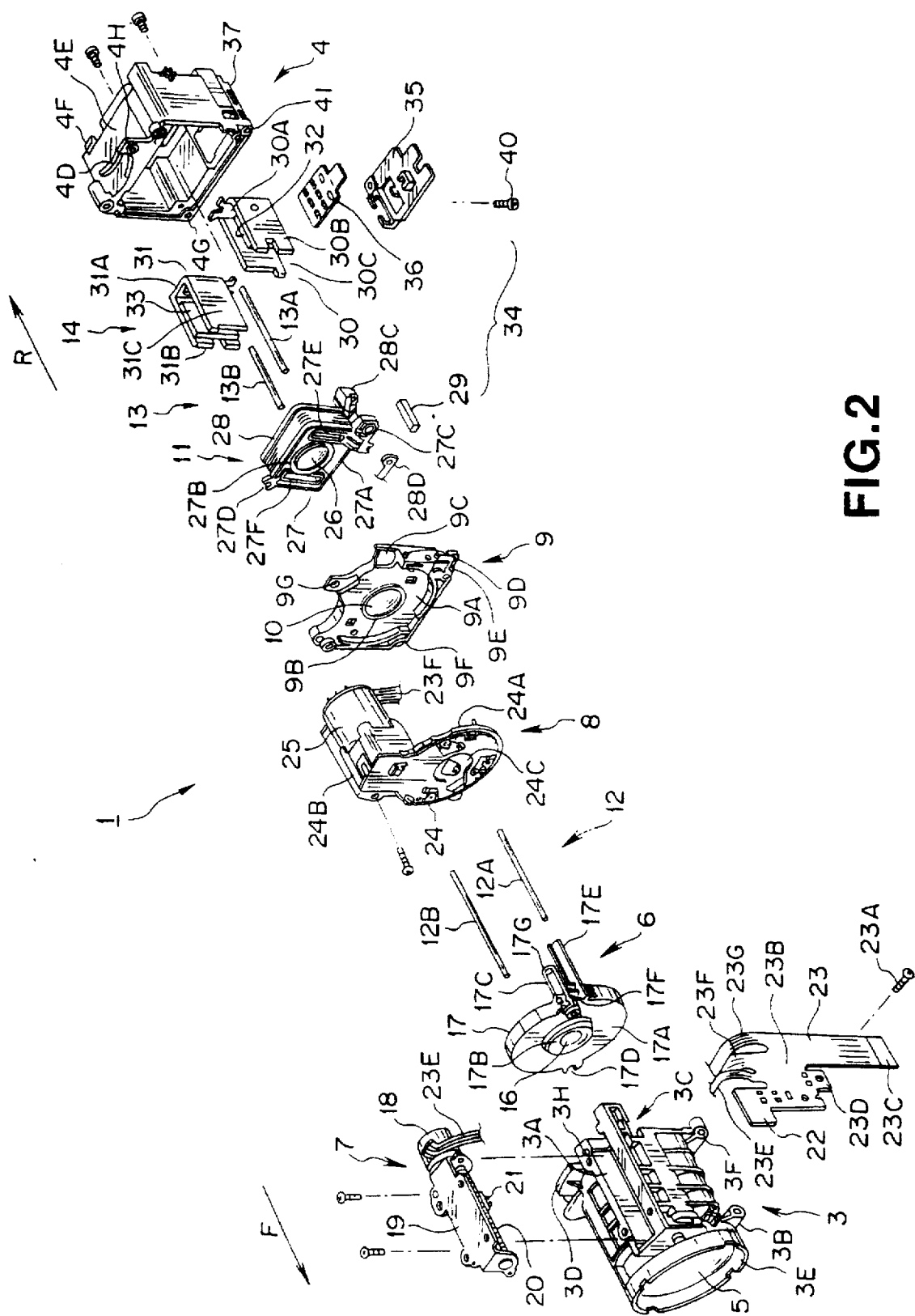
FIG. 2 is an overall broken down perspective view of a lens mirror cylinder mounted on a video camera shown as a first embodiment of the present invention.
Figure 3:
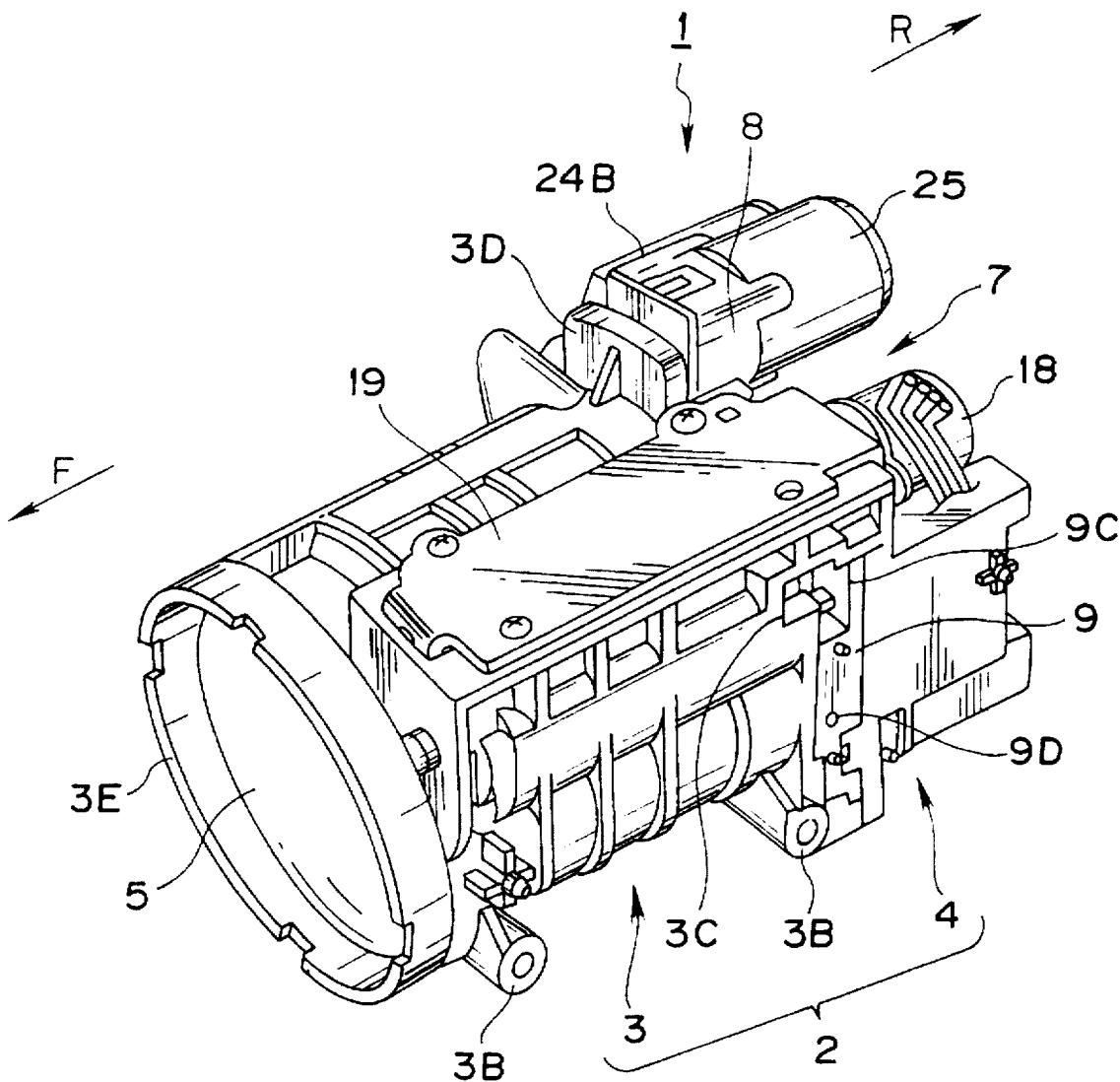
FIG. 3 is an overall perspective view of the same lens mirror cylinder.

In the embodiment, a lens mirror cylinder 1 provided with an auto-focus mechanism which is mounted on the video camera and automatically performs the focusing with respect to the photographic object and a motorized zoom mechanism performing the change of magnification is shown. The lens mirror cylinder 1 is provided with, as shown in FIG. 2 and FIG. 3, a mirror cylinder 2 constituted by combining a front mirror cylinder 3 formed in a cylindrical shape and a rear mirror cylinder 4 formed in a square cylindrical shape via an intermediate frame 9. The front mirror cylinder 3 has a slightly larger opening diameter than the rear mirror cylinder 4. Note that, in the following explanation, a term "forward" indicates an arrow F side in FIG. 2 and FIG. 3, and "rearward" indicates an arrow R side.

In the front mirror cylinder 3, a first fixed lens group 5 constituting the first fixed lens structure 5, a first movable lens group constituting the zoom lens structure 6 of the motorized zoom mechanism, and a zoom lens driving unit 7 driving the zoom lens structure 6 are installed from the forward side. Further, in the rear mirror cylinder 4, a second fixed lens group 10 and a second movable lens group constituting the focus lens structure 11 of the auto-focus mechanism are installed from the forward side via the intermediate frame 9 in which a diaphragm unit 8 is installed.

In this way, the lens mirror cylinder i is constituted by two stationary groups and two movable lens groups. Note that, the term "stationary lens group" indicates one or a plurality of lens groups which are not moved in the light axis direction at the time of filming and are installed in the mirror cylinder 2, and "movable lens group" is one or a plurality of lens groups which are moved in the light axis direction in the mirror cylinder 2 at the time of filming.

The front mirror cylinder 3 is provided with a guide groove 3A in the axial direction over an area from the rear end to the front end. At the same time, a plurality of attachment portions 3B for attaching the lens mirror cylinder 1 to the video camera are integrally formed on the outer periphery thereof. In the front mirror cylinder 3, a zoom lens driving unit 7 for moving the zoom lens structure 6 in the light axis direction so as to close the guide groove 3A is installed. In the front mirror cylinder 3, a confirmation hole 3C is provided for enabling visual confirmation from the outside of the engagement between the zoom lens structure 6 and the zoom lens driving unit details of which will be discussed later, positioned at the rear end in close contact with the guide groove 3A.

In the front mirror cylinder 3, a plate-like stopper rib 3D is integrally projected at the outer periphery of the rear opening adjacent to the guide groove 3A. This stopper rib 3D stops and holds the forward side of the drive control unit 25 of the diaphragm unit 8 as shown in FIG. 2 in a state where the constituent members are installed and the lens mirror cylinder 1 is assembled as will be mentioned later. In the front mirror cylinder 3, an annular flange 3E given a slightly large diameter is integrally formed on the outer periphery of the forward opening so as to be projected therefrom. On this annular flange 3E, a protective cap (not illustrated) is mounted for protecting the first fixed lens group 5.

Figure 9:
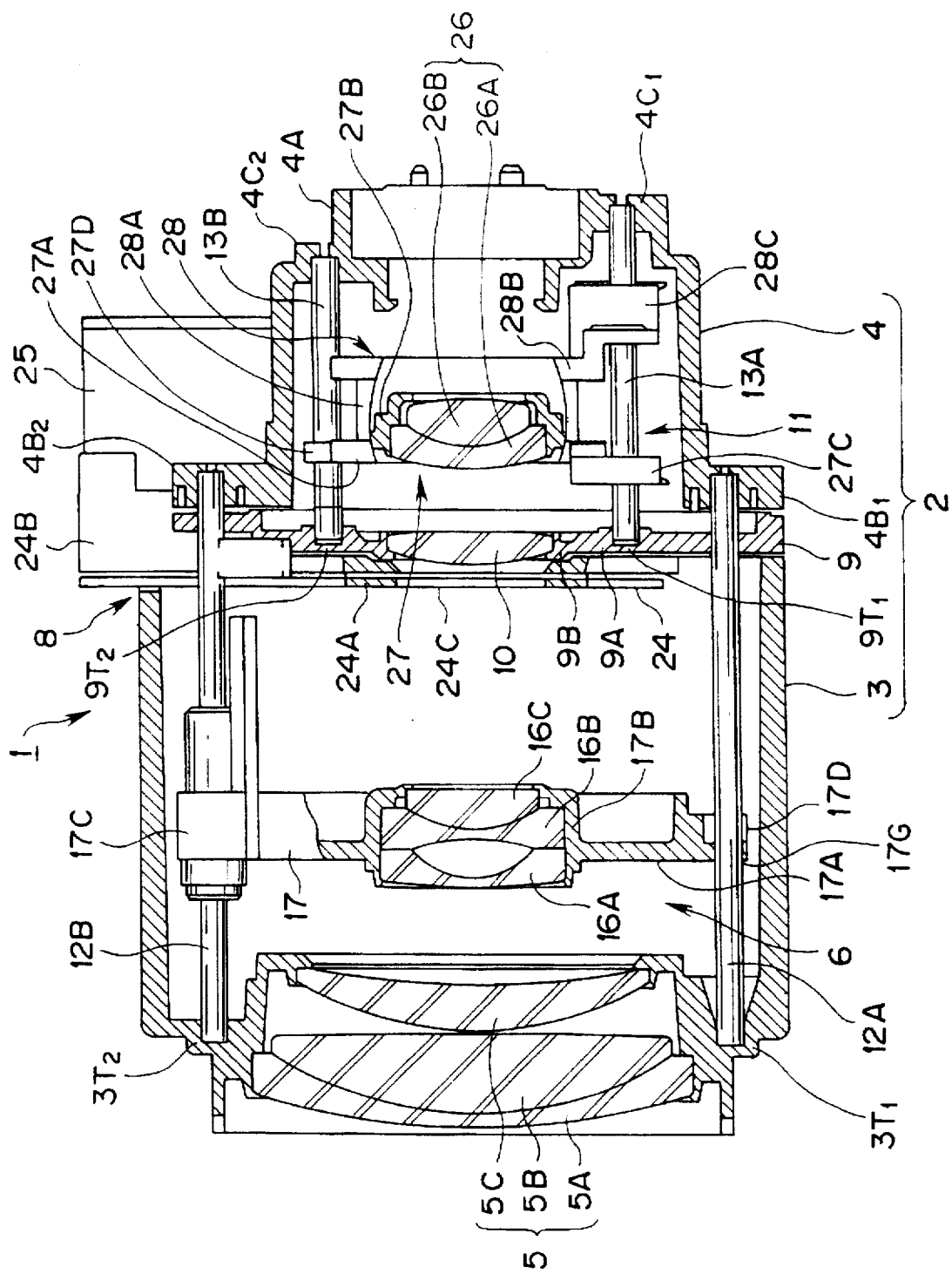
FIG. 9 is a vertically sectional view of the principal parts explaining the constitution of the internal portion of the same lens mirror cylinder.

In the rear mirror cylinder 4, as shown in FIG. 9, a CCD installation portion 4A in which the not illustrated CCD solid-state camera element is installed is integrally formed at the opening on the rear end side. Further, in the rear mirror cylinder 4, first guide shafts 12 (12A, 12B) which are positioned at corners facing each other and are in parallel with each other with respect to the light axis direction and second guide shafts 13 (13A, 13B) which are positioned at the other corners facing each other and in parallel with each other with respect to the light axis direction are disposed. Further, in the rear mirror cylinder 4, a focus lens driving means 14 for driving the focus lens structure 11 is arranged. In the rear mirror cylinder 4, a focus lens position detection means 34 for detecting the reference position of the focus lens structure 11 is arranged.

In the rear mirror cylinder 4, a rib 4D in the form of an arc in the axial direction is integrally formed in a ceiling 4E. This rib 4D is formed to be positioned on the same axis as the stopper rib 3D of the front mirror cylinder 3 and supports the lower portion of the drive control unit 25 of the diaphragm unit 8 in a state where the constituent members are installed and the lens mirror cylinder 1 is assembled as will be mentioned later. Further, in the rear mirror cylinder 4, a stopper piece 4F which is positioned at the rear end of the ceiling 4E and exhibits a lateral L-shape is integrally formed.

Figure 11:
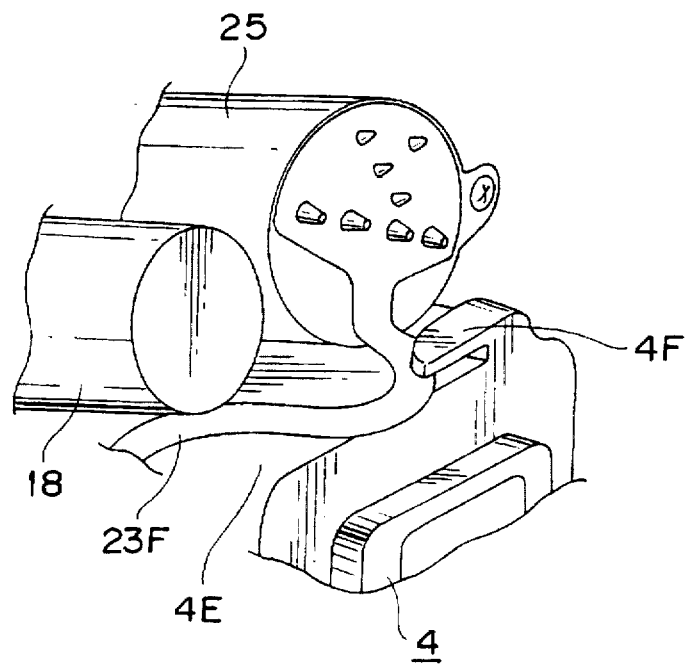
FIG. 11 is a perspective view of the principal part showing the wiring portion to the diaphragm device provided in the same lens mirror cylinder.

This stopper piece 4F sandwiches the flexible cable 23F supplying the electric power to the drive control unit 25 of the diaphragm unit 8 with the circuit portion 4E to holds this and prevents the generation of the floating phenomenon as shown in FIG. 11. The flexible cable 23F is directly soldered to the drive control unit 25 without the use of a connector as will be mentioned later. When it is held by the stopper piece 4F, it becomes possible to efficiently perform this soldering work. Accordingly, in the lens mirror cylinder 1, in addition to an improvement of the workability, the problem of the increase of size due to the connector is avoided.

The first guide shafts 12 (12A, 12B) are largely projected forward while being fitted in and supported by the bearing portion disposed in the flange 4 (4B$_1$, 4B$_2$) one end portion of which being formed so as to project at the outer periphery of the opening of the rear mirror cylinder 4. In a state where the front mirror cylinder 3 and the rear mirror cylinder 4 are combined, as shown in FIG. 9, the forward end is fitted in the shaft holes 3T (3T$_1$, 3T$_2$) formed in the inner surface of the front mirror cylinder 3. The first guide shafts 12 (12A, 12B) have a length long enough for the range of movement of the zoom lens structure 6 and support this zoom lens structure 6 in the front mirror cylinder 3 so that it can freely move in the light axis direction.

In each of the second groove shafts 13 (13A, 13B), one end portion is fitted in and supported by a shaft hole disposed in the rear walls 4C (4C$_1$, 4C$_2$) constituting the CCD installation portion 4A of the rear mirror cylinder 4, and the other end portion is extended to the forward opening end. In the second guide shafts 13 (13A, 13B), these other ends are fitted in the shaft holes (9T$_1$, 9T$_2$) formed in the intermediate frame 9 combined so as to close the forward opening of the rear mirror cylinder 4. The second guide shafts 13 have lengths long enough for the range of movement of the focus lens structure 11 and support this focus lens structure 11 in the rear mirror cylinder 4 so that it freely moves in the light axis direction.

The first fixed lens group 5 is constituted by a first lens 5A, a second lens 5B, and a third lens 5C which are adhered to each other as shown in FIG. 9. The lenses 5A through 5C constituting this first fixed lens group 5 are installed in the forward opening end of the front mirror cylinder 3 while bringing the light axes into coincidence with each other. The first fixed lens group 5 is protected by a cap member mounted on the annular flange 3E formed in the forward opening of the front mirror cylinder 3 as mentioned above.

The zoom lens structure 6 constituting the first movable lens group is constituted by three zoom lenses 16 (16A through 16C) and a lens holder 17 having a substantially disk-like shape as shown in FIG. 9. In the lens holder 17, a cylinder 7B in the axial direction is integrally formed at the center of the disk-like base 17A and, at the same time, a pair of bearings 17C and 17D are integrally formed on the outer periphery. In the cylinder 17B, the zoom lens 16 is installed while bringing its light axis into coincidence with the first fixed lens group 5. The bearings 17C and 17D are formed at positions facing each other 180° relative to each other in the outer periphery of the base 17A and through which the first guide shafts 12 (12A, 12B) are penetrated. On the side surface of the base 17A, a position detection piece 17E which is long in the axial direction, the sectional shape of which being made a semi-circle, is integrally formed parallel to the first bearing 17C.

Figure 4:
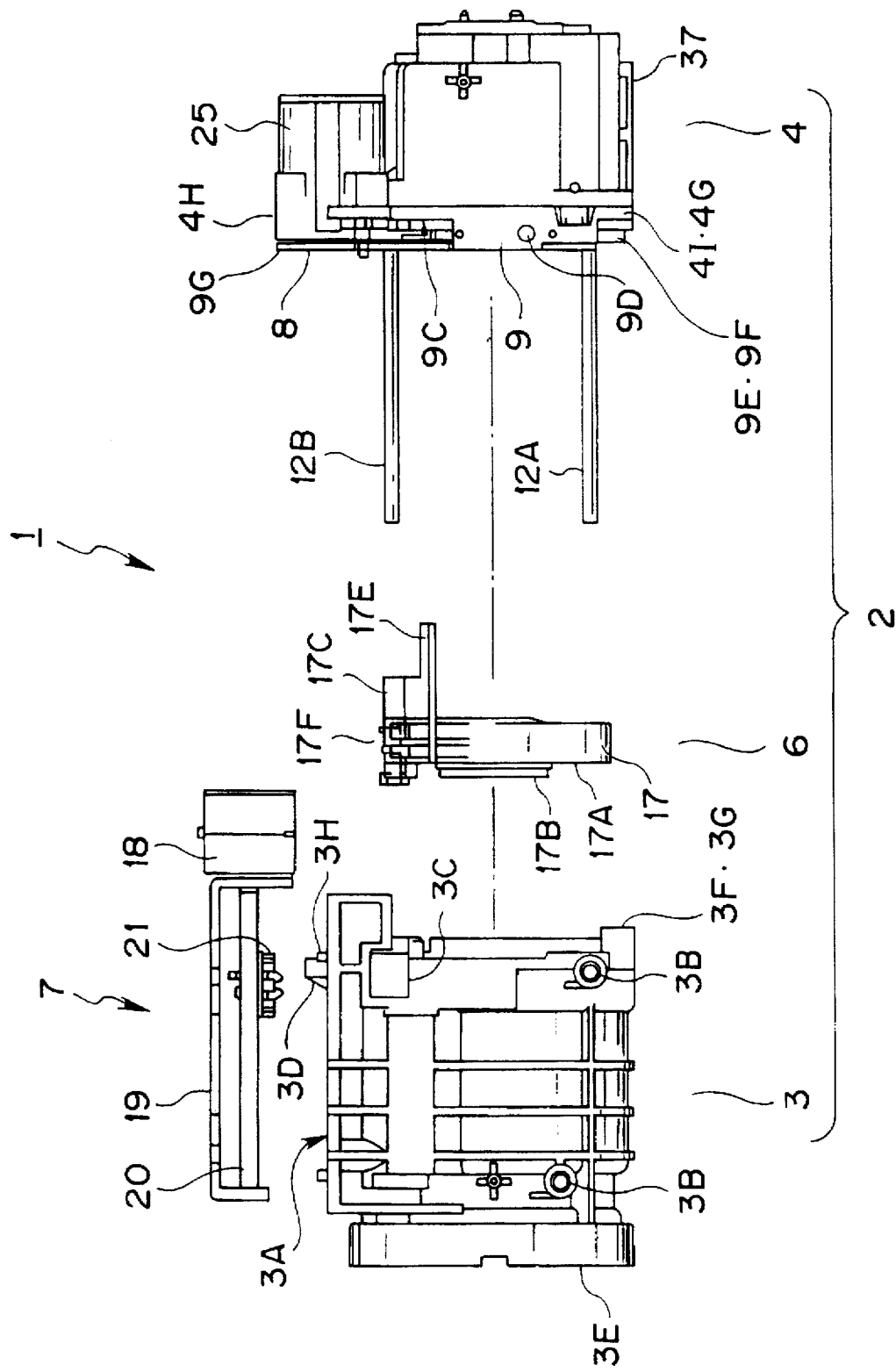
FIG. 4 is a broken down side view shown by breaking down the constituent portions of the same lens mirror cylinder.
Figure 5:
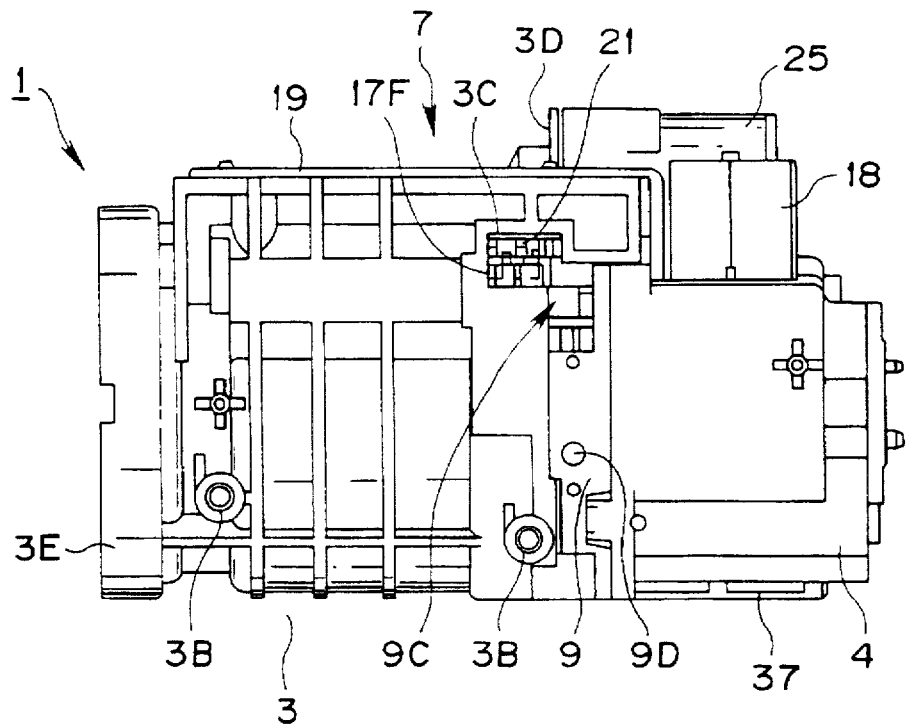
FIG. 5 is a side view of an assembled state of the same lens mirror cylinder and showing a state where the board closing the confirmation hole is removed.

The first bearing 17C is constituted as a cylinder having a long axis wherein one part of the center is recessed. This first bearing 17C is extended corresponding to the guide groove 3A disposed in this front mirror cylinder 3 in a state where the zoom lens structure 6 is installed in the front mirror cylinder 3 via the first guide shaft 12A penetrated through the shaft hole 17G. At this first bearing 17C, as shown in FIG. 4, an engagement projection 17F which faces the guide groove 3A and is orthogonal to the axial direction is integrally formed. This engagement projection 17F is positioned corresponding to the confirmation hole 3C disposed in the front mirror cylinder 3 in a state where the zoom lens structure 6 supported by the first guide shaft 12 is positioned at the last portion of the front mirror cylinder 3. Note that, the second bearing 17D is formed as a partially opened projection having substantially a U-shape at the outer periphery so as to improve the ease of assembly with the first glide shaft 12B.

The zoom lens driving unit 7 is constituted by, as shown in FIG. 2, a stepping motor 18, a bracket member 19 in which this stepping motor 18 is installed at one side portion, a feed screw shaft 20 which is rotatably supported between the side portions of this bracket member 19 and driven to rotate by the stepping motor 18, a not illustrated guide shaft supported and bridged between the side portions of the bracket member 19 parallel to this feed screw shaft 20, and a driver 21 which is supported by the feed screw shaft 20 and the guide shaft so that it can freely move in the axial direction.

The bracket member 19 has an outer dimension large enough to close the guide groove 3A provided in the front mirror cylinder 3. The feed screw shaft 20 is rotatably supported and bridged between the two side portions of this bracket member 19 via the bearing. At the same time, one end is integrally formed with the rotation shaft of the stepping motor 18. Further, this feed screw shaft 20 has a length long enough for the range of movement of the zoom lens structure 6. On the outer periphery, a minute feed thread is integrally formed. The driver 21 is constituted by a plate-like base, a first bearing and a second bearing which are integrally formed while being spaced in the width direction in the upper surface of this base, and a pair of engagement pieces integrally formed in the bottom surface of the base, though not described in detail.

In the first bearing, a fine inner circumferential thread engaging with the outer circumferential thread of the feed screw shaft 20 is formed in the inner circumferential wall of the shaft hole through which the feed screw shaft 20 is penetrated. In the second bearing, the guide shaft is penetrated through the shaft hole thereof. The driver 21 is moved in the axial direction by the engagement between the outer circumferential thread and the inner circumferential thread since the rotation is prohibited by the guide shaft when electric power is supplied to the stepping motor 18 and the feed screw shaft 20 is driven to rotate.

The zoom lens driving unit 7 is installed in the front mirror cylinder 3 so as to close the guide groove 3A in a state where the zoom lens structure 6 is installed in the front mirror cylinder 3 via the first guide shaft 12. With the driver 21, the engagement projections 17F formed in the lens holder 17 are engaged with each other between a pair of engagement pieces in a state where the zoom lens driving unit 7 is installed in the front mirror cylinder S in this way.

The engagement piece of the engagement projection 17F or the driver 21 of the lens holder 17 is constituted as a combination of a relatively small projection and recess. Further, the zoom lens structure 6 freely moves with respect to the front mirror cylinder 3 where the zoom lens driving unit 7 is installed in the front mirror cylinder 3. In the lens mirror cylinder 1, the zoom lens driving unit 7 must be installed in the front mirror cylinder 3 while reliably engaging with the engagement pieces of the engagement projection 17F of the lens holder 17 and the driver 21 under such conditions. In the lens mirror cylinder 1, by disposing the confirmation hole 3C in the front mirror cylinder 3 as mentioned above, it becomes possible to visually confirm the engagement between the engagement projection 17F and the engagement piece at the time of the assembly, so they are reliably engaged with a good workability and the occurrence of malfunctions etc. is prevented.

In the lens mirror cylinder 1, when electric power is supplied to the stepping motor 18 and the feed screw shaft 20 is driven to rotate, the driver 21 operates to move along the guide shaft. The operation of this driver 21 is transferred to the lens holder 17 via the engagement projection 17F engaged with the engagement piece, so that the zoom lens structure 6 is supported by the first guide shaft 12 and moves in the front mirror cylinder 3 in the light axis direction. In the lens mirror cylinder 1, the zoom control operation is carried out by the operation of this zoom lens structure 6.

Figure 6:
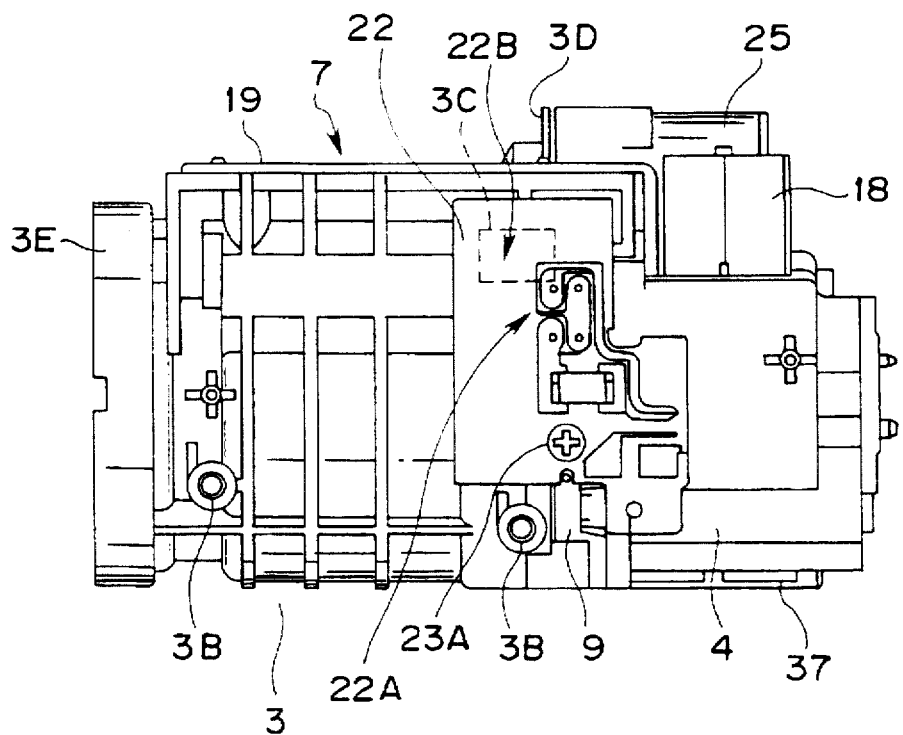
FIG. 6 is a side view of the assembled state of the same lens mirror cylinder, and showing a state where the board closing the confirmation hole is attached.
Figure 7:
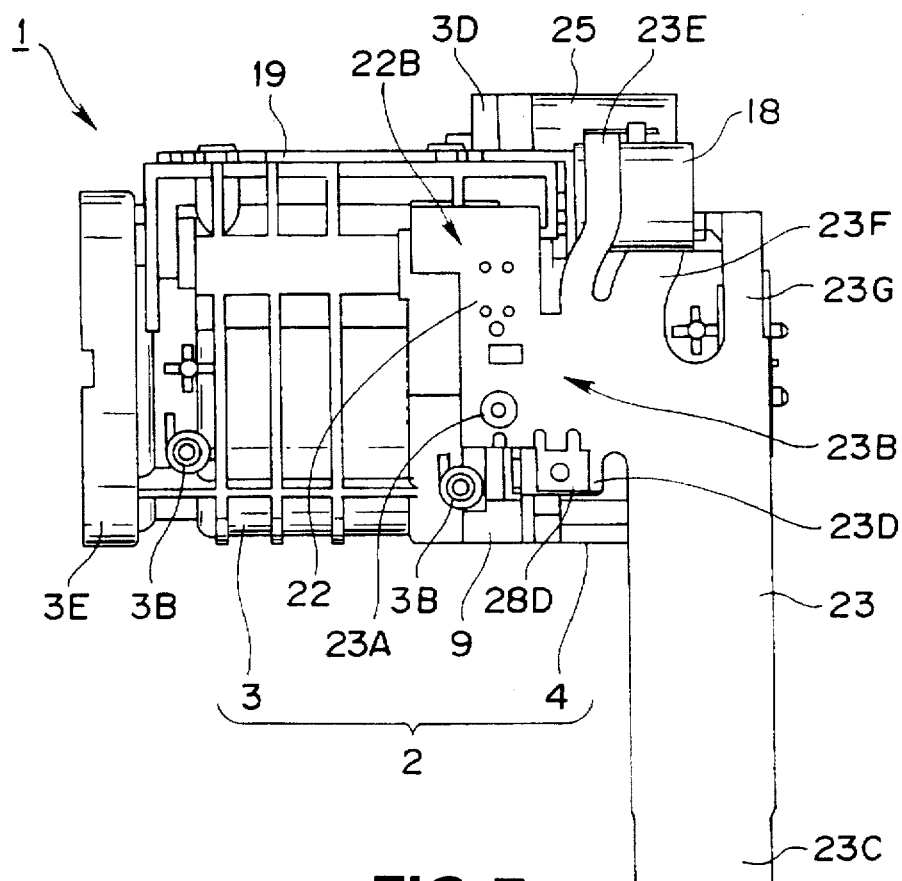
FIG. 7 is a side view of the assembled state of the same lens mirror cylinder showing a state where a flexible cable is attached.

However, the confirmation hole 3c allows the intrusion of dust etc. to the internal portion or guides unnecessary light from the side to the internal portion of the front mirror cylinder 3 since it constitutes an opening in the front mirror cylinder 3. Accordingly, this confirmation hole 3C is closed by a sensor board 22 installed at the outer periphery of the front mirror cylinder 3 after the zoom lens driving unit 7 is installed in the front mirror cylinder 3 as shown in FIG. 6. The sensor board 22 is connected to the flexible cable 23 for supplying electric power to the stepping motor 18 and the other portions. As shown in FIG. 7, the zoom lens position detection sensor 22A performing the detection of position of the zoom lens structure 6 in the front mirror cylinder 3 is mounted on this. This constitutes the zoom lens position detection means.

In other words, the lens mirror cylinder 1 also serves as a closing means in which one part of the sensor board 22 constituting the zoom lens position detection means detecting the position of the zoom lens structure 6 in the front mirror cylinder 3 is extended to form a closed portion 22B. Occurrence of malfunctions is prevented by this closed portion 22B, and the confirmation hole 3C which improves the ease of assembly of the zoom lens driving unit 7 with respect to the front mirror cylinder 3 is closed. The sensor board 22 is assembled to the outer periphery of the mirror cylinder 2 by the screw 23A screwed into the screw hole 9D disposed in the side surface of the intermediate frame 9.

The zoom lens position detection sensor 22A is constituted by the light emitting diode and the light receiving element which are mounted on the sensor substrate 22 so as to face each other and positioned corresponding to the detection hole 9C formed in the intermediate frame 9 mentioned later in a state where the sensor board 22 is assembled in the front mirror cylinder 3. This detection hole 9C is disposed so that the zoom lens position detection sensor 22A is positioned at the center of the range of movement of the zoom lens structure 6 and, at the same time, disposed corresponding to the range of movement of the position detection piece 17E integrally formed in the lens holder 17 of the zoom lens structure 6. Accordingly, in the zoom lens position detection sensor 22A, the light emitting diode and the light receiving element are positioned facing each other so as to sandwich the range of movement of the position detection piece 17E of the lens holder 17 therebetween.

In the zoom lens position detection means, in the zoom control operation mentioned above, where for example the zoom lens structure 6 moves from the forward position of the front mirror cylinder 3 to the rear mirror cylinder 4 and passes the center position, the position detection piece 17E blocks the light emitting diode from the light receiving element of the zoom lens position detection sensor 22A. The zoom lens position detection sensor 22A transmits the detection output detecting the passing of the position detection piece 17E by the change of the current value due to the blocking operation of this position detection piece 17E to the control unit. The stepping motor 18 is controlled in its rotation direction and the driving time by the output of this position detection sensor 22A, and the zoom control operation of the zoom lens structure 6 is carried out.

The flexible cable 23 is a slightly wide cable comprised of a region integrally supporting the sensor substrate 22 via the connection portion 23B and a region of the connection portion with the other portions integrally formed together, as shown in FIG. 2 and FIG. 7. A terminal portion 23C is formed at one end and connected together with a not illustrated control unit and the power supply unit via a connector etc. In the flexible cable 23, a connection portion 23D to which the flexible cable 28D supplying electric power to the coil 28 constituting part of the focus lens driving means 14 mentioned later is formed in the lower end of one region in which the sensor board 22 is arranged. In the flexible cable 23, the upper end of the other region is branched into three cable portions 23E through 23G.

The first cable portion 23E constitutes the power supply cable to the stepping motor 18 of the zoom lens driving unit 7. The second cable portion 23F is guided to the ceiling 4E of the rear mirror cylinder 4 as mentioned above and engaged with the engagement piece 4F and constitutes the power supply cable of the drive control unit 25 of the diaphragm unit 8. The third cable portion 23G constitutes the signal cable of the focus lens position detection sensor 36 of the focus lens position detection means 34 mentioned later. The cable portions 23E through 23G are directly connected to their members by soldering at the tip ends, respectively. In the lens mirror cylinder 1, electric connection of the portions is carried out by one flexible cable 23 and, at the same time, the members are directly soldered, whereby simplification of the wiring work is achieved.

The diaphragm unit 8 is installed so as to be positioned in the rear opening of the front mirror cylinder 3 and supported by the intermediate frame 9 as shown in FIG. 2 and is constituted by a diaphragm body 24 comprising a disk-like base 24A and an attachment portion 24B integrally projected at the outer periphery of this base 24A and a drive control unit 25 attached to this attachment portion 24B. In the base 24A of the diaphragm body 24, a diaphragm hole 24 with a light axis brought into coincidence with those of the lens groups is formed at the center. Further, the base 24A is constituted by superimposing two thin disks on each other. A plurality of diaphragm leaves adjusting the opening diameter of the diaphragm hole 24C are moveably installed between these disks. The drive control unit 25 provides an actuator which drives the diaphragm leaves to control the aperture of the mirror cylinder 2 etc.

In the diaphragm unit 8, the base 24A is combined with the forward side of this intermediate frame 9 so that its outer periphery is surrounded by the circumferential walls constituting the accommodating recess 9A of the intermediate frame 9 mentioned later. The diaphragm unit 8 is installed by attaching the slightly heavy drive control unit 25 to the outer periphery of the base 24A formed as a thin disk via the attachment portion 24B as mentioned above. Accordingly, in the diaphragm unit 8, there is a concern that the base 24A will bend in the direction of thickness due to the weight of this drive control unit 25. Further, there is a concern that the diaphragm unit 8 will be damaged where a force from the outside is applied by carrying the video camera by hand etc. in a state where the lens mirror cylinder 1 is installed in the video camera body.

In the diaphragm unit 8, the forward portion of the drive control unit 25 is held by engagement by the stopper rib 3D of the front mirror cylinder 3 in a state where the diaphragm unit 8 is combined with the rear mirror cylinder 4 via the intermediate frame 9 and where the front mirror cylinder 3 and the rear mirror cylinder 4 are combined. At the same time, the outer periphery is supported by the supporting rib 4D in the form of an arc formed on the outer circumferential wall of the rear mirror cylinder 4. Accordingly, in the diaphragm unit 8, it is possible to prevent the occurrence of the bending of the base 24A of the diaphragm body 24 etc. or damage due to the force applied from the outside by tightly holding the weighty drive control unit 25 in the mirror cylinder 2.

The diaphragm unit 8 constituted as described above adjusts the dimensions of the opening of the diaphragm hole 24C by the driving of the diaphragm leaves by the driving of the drive control unit 25 in response to the output from the control unit. In the lens mirror cylinder 1, the adjustment of the lens aperture is carried out by the operation of this diaphragm unit 8. Note that, naturally the diaphragm unit 8 can be constituted by a diaphragm unit using for example an electrochromic element etc.

The intermediate frame 9 is formed with an outer dimension large enough to close the rear opening of the front mirror cylinder 3 and in which the accommodating recess 9A constituted by a plurality of arc walls having an inner diameter and a height satisfactory for accommodating the base 24A of the diaphragm unit 24A is formed in the main surface of the front surface. In the intermediate frame 9, the lens installation hole 9B wherein the second fixed lens 10 is installed is disposed at the center while bringing its light axis into coincidence with those of the lens groups of the first fixed lens group 5 and the first movable lens group. In the intermediate frame 9, together with the detection hole 9C and the screw hole 9D, a shaft hole which is positioned on the outer peripheral side and through which the first guide shaft 12 is penetrated, an attachment hole for installation in a state where the position is adjusted with respect to the front mirror cylinder 3 or the rear mirror cylinder 4, a positioning projection, etc. are appropriately formed, though a detailed description is omitted.

Figure 8:
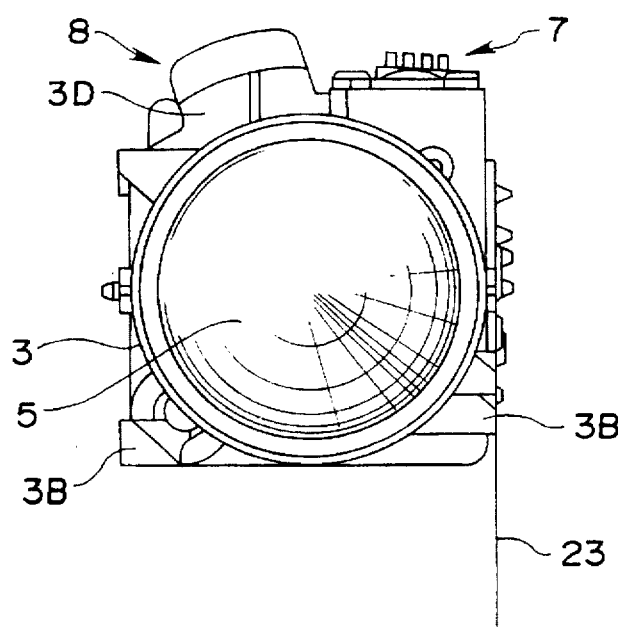
FIG. 8 is a front view of the assembled state of the same lens mirror cylinder.

Note that, the zoom lens structure 6 moves in the front mirror cylinder 3 over a region from the inside of the third lens 5C of the first fixed lens group 5 to the front surface of the diaphragm unit 8. Accordingly, the position detection piece 17E integrally formed in the lens holder 17 faces the intermediate frame 9 by 180° at a position where the zoom lens structure 6 is in close contact with the front surface of the diaphragm unit 8, but it penetrates through the detection hole 9C and extends to the rear mirror cylinder 4 side, whereby a reduction of size of the mirror cylinder 2 is achieved. The intermediate frame 9 supports the tip ends of the second guide shafts 13 (13A, 13B) by bridging, by the bearings ($9T_1$, $9T_2$) formed on the main surface of the back surface as shown in FIG. 8 in a state where it is installed so as to close the forward opening of the rear mirror cylinder 4 via the attachment hole and positioning projection.

The lens mirror cylinder 1 is constituted so as to combine the front mirror cylinder 3 and the rear mirror cylinder 4 via the intermediate frame 9 as mentioned above, whereby the diaphragm unit 8 is assembled by this intermediate frame 9, the long first guide shaft 12 is supported midway, and further one end of the second guide shaft 13 is supported. For this reason, the lens housing 1 slightly simplifies the constitution of the front mirror cylinder 3 and the rear mirror cylinder 4 and, at the same time, as a whole, improves the assembly work and ensures the precision of the light axis direction.

The lens mirror cylinder 1 is connected at three positions of the two corners on the bottom surface and the center of the ceiling. Namely, in the front mirror cylinder 3, a first connection portion 3F through a third connection portion 3H are integrally formed at three positions of the two corners on the bottom surface and the center of the ceiling. In the rear mirror cylinder 4, corresponding to the positions of the first connection portion 3F through the third connection portion 3H of the front mirror cylinder 3, a first connection portion 4G through a third connection portion 4I are integrally formed at three positions of the two corners on the bottom surface and the center of the ceiling. Similarly, also in the intermediate frame 9, a first connection portion 9E through a third connection portion 9G comprising through-holes are integrally formed at three positions of the two corners on the bottom surface and the center of the ceiling.

The front mirror cylinder 3, the rear mirror cylinder 4, and the intermediate frame 9 are integrally formed by screwing the stopping screws 2A through 2C in a state where respectively corresponding first connection portions 3F, 4I, and 9E, the second connection portions 3G, 4G, and 9F, and the third connection portions 3H, 4H, and 9G face each other to constitute the mirror cylinder 2. In the mirror cylinder 2, assembly is therefore achieved with a good precision with the least number of connection portions.

The focus lens structure 11 constituting the second movable lens group is constituted by, as shown in FIG. 9, members such as the two focus lenses 26 (26A, 26B), a lens holder 27, a coil 28 integrally formed with this lens holder 27, an MR magnet 29 constituting the focus lens position detection unit, etc. The lens holder 27 is constituted by a base 27A constituted as the rectangular frame and a cylinder 27B which is integrally formed while being positioned at the center of this base 27A and in which the focus lens 26 is installed.

In the lens holder 27, bearings 27C and 27D through which the second guide shaft 13 is penetrated are respectively integrally disposed at the corners of the base 27A facing each other so as to be projected therefrom. In the base 27A, yoke holes 27E and 27F constituted as rectangular holes in the height direction and positioned at two sides of the cylinder 27B are respectively made. In the base 27A, a coil portion 28A of the coil 28 exhibiting a square cylindrical shape having a larger diameter than that of this cylinder 27B is integrally continuously disposed on the back surface so as to extend to the outer periphery of the cylinder 27B. The coil 28 is constituted by the coil portion 28A and the rectangular flange 28B facing the base 27A of the lens holder 27. In other words, the base 27A of the lens holder 27 constitutes one flange of the coil 28. The coil wire is wound on the outer circumferential surface of the coil portion 28A between this base 27A and the flange 28B. Further, the cylinder 27B extends in the axial direction while being positioned in the coil hole of the coil 28.

Figure 10:
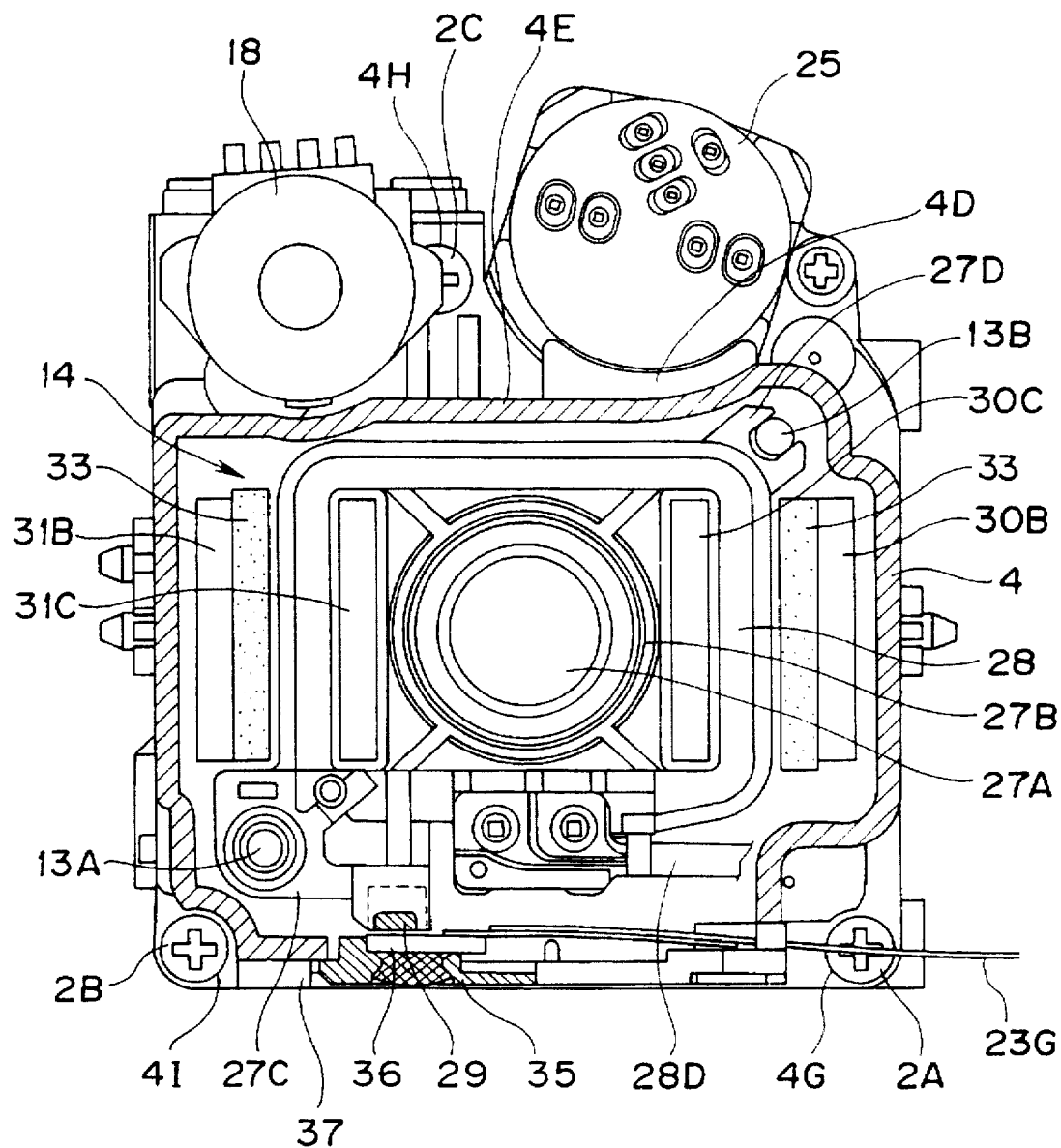
FIG. 10 is a vertically sectional view showing the forward side by vertically cutting the rear mirror cylinder portion of the same lens mirror cylinder.

The two ends of the coil wire of the coil 28 are connected to the flexible cable 28D. This flexible cable 28D is outwardly drawn from the drawing portion formed on the forward side of the rear mirror cylinder 4, a detailed description of which being omitted. The connection between the coil wire and the flexible cable 28D is made at the bottom surface of the coil 28 as shown in FIG. 10, in other words, at the bottom surface of the rear mirror cylinder 4 after space efficiency is achieved in the vertical direction as will be mentioned later. The flexible cable 28D is connected to the connection portion 23D of the flexible cable 23 as shown in FIG. 7. Accordingly, a current is supplied to the coil 28 from the power supply portion via the flexible cable 23.

At the coil 28, a bearing 28C is integrally projected at the corner facing the flange 28B. This bearing 28C faces the first bearing 27C formed in the base 27A on the lens holder 27 side and is penetrated by the second guide shaft 13A. In the first bearing 27C and the bearing 28C, the two ends of the MR magnet 29 formed in the square rod shape are supported by the magnetic material. In the MR magnet 29, the N pole and the S pole are alternately magnetized in the light axis direction. In a state where the focus lens structure 11 is assembled in the rear mirror cylinder 4, it is extended along the inner surface of this rear mirror cylinder 4.

The focus lens structure 11 is moved in the rear mirror cylinder 4 in the light axis direction by the focus lens driving means 14 including the coil 28 obtained by winding the coil wire and the yokes 30 and 31. As mentioned above, the coil 28 and a pair of left and right yokes 30 and 31 constitute a focus lens driving linear motor (by two magnetic circuits arranged at positions facing each other while sandwiching the light axis therebetween). Namely, the focus lens driving means 14 is constituted by a pair of left and right yokes 30 and 31 and magnets 32 and 33 which are assembled in these yokes 30 and 31, respectively. These yokes 30 and 31 are formed exhibiting a squared U-shape as a whole and comprise a pair of outside yoke pieces 30B and 30C and inside yoke pieces 31B and 31C respectively forwardly bent from the two sides of the bases 30A and 31A in the height direction while facing parallel to each other.

The interval between the outside yoke piece 30B and the inside yoke piece 30C and between the outside yoke piece 31B and the inside yoke piece 31C is slightly larger than the thickness dimension of the coil 28 constituting the focus lens structure 11 and has a sectional shape slightly smaller than the dimension of the opening of the yoke holes 27E and 27F. Further, the yoke pieces 30B and 30C and the yoke pieces 31B and 31C have a length long enough for the range of movement of the focus lens structure 11 and, at the same time, have a length slightly shorter than that of the rear mirror cylinder 4 in the front and rear direction.

The magnets 32 and 33 exhibit a thin plate-like shape as a whole and are joined and fixed to the inner surface of the outside yoke pieces 30B and 31B of the yokes 30 and 31 over almost the entire area of the axial direction while being in close contact with the outer periphery of the coil portion 28A of the coil 28. Note that, for these magnets 32 and 33, use is made of a magnet having a large magnetic force by for example slightly increasing the thickness dimension so as to make the magnetic driving force almost equivalent to that of a linear motor comprising four magnetic circuits arranged at the upper, lower, left ,and right positions so as to surround the lens holder while sandwiching the light axis therebetween to act with respect to the focus lens structure 11 since the focus lens driving means 14 is constituted as a linear motor comprising four magnetic circuits arranged at the upper, lower, left, and right positions so as to surround the lens holder while sandwiching the light axis therebetween. Of course, the adoption of the linear motor is achieved not only by these magnets, but also by the maintenance of the magnetic driving force by the reduction of weight of the moveable focus lens structure 11 by the integral formation of the lens holder 27 and the coil 28.

In the yokes 30 and 31 constituting part of the focus lens driving means 14, the bases 30A and 31A are attached to the rear wall 4C of the rear mirror cylinder 4. For these yokes 30 and 31, when the focus lens structure 11 is supported by the second guide shaft 13 and assembled in the rear mirror cylinder 4 so that it freely moves, the inside yoke pieces 30C and 31C are penetrated through the yoke holes 27E and 27F formed in the base 27A of the lens holder 27 and, at the same time, the outside yoke pieces 30B and 31B are extended in close contact with the outer periphery of the coil portion 28A of the coil 28 obtained by winding the coil wire.

Accordingly, the focus lens structure 11 and the focus lens driving means 14 assembled in the rear mirror cylinder constitute the right side closed magnetic path of the outside yoke piece 30B—magnet 32—inside yoke piece 30C—base 30A—outside yoke piece 30B on the yoke 30 side. Similarly, the focus lens structure 11 and the focus lens driving means 14 constitute the left side closed magnetic path of the outside yoke piece—magnet 33—inside yoke piece 31C—base 31A—outside yoke piece 31B.

Further, the coil portion 28A of the focus lens structure 11 blocks these closed magnetic paths and, at the same time, generates a magnetic flux in accordance with the direction of the driving current by the supply of this driving current from the power supply portion by the not illustrated control unit and makes this act upon the left and right closed magnetic paths. The focus lens structure 11 moves in the rear mirror cylinder 4 in the forward and backward direction while being supported by the second guide shaft 13 by the magnetic driving force generated between the left and right closed magnetic paths and the coil portion 28A.

The position of the focus lens structure 11 in the mirror cylinder 2 is detected by a focus lens position detection means 34 constituted by an MR magnet 29, a sensor holder 35 which is attached to the sensor attachment portion 37 integrally formed in the rear mirror cylinder 4, and a focus lens position detection sensor 36 mounted on this sensor holder 35. The focus lens position detection sensor 36 is a magnetic sensor with a resistance value which changes with the change of the magnetic flux density. By counting the resistance value of this focus lens position detection sensor 36 with the control unit, the position of the focus lens structure 11 in the mirror cylinder 2 is detected, and the supply of current to the coil portion 28A is controlled.

The sensor holder 35 is attached by engagement of its tip end with the engagement groove constituting the sensor attachment portion 37 of the rear mirror cylinder 4. The sensor attachment portion 37 is formed in the outer circumferential surface of the rear mirror cylinder 4 corresponding to the range of movement of the MR magnet 29 installed in the focus lens structure 11. In this sensor attachment portion 37, a not illustrated detection hole facing the range of movement of the MR magnet 29 is disposed. Accordingly, in a state where the sensor holder 35 is attached to the sensor attachment portion 37, the focus lens position detection sensor 36 which is mounted on this is made to face the range of movement of the MR magnet 29 from the detection hole.

The lens mirror cylinder 1 moves in the rear mirror cylinder 4 by supporting the focus lens structure 11 by the second guide shaft 13 by the magnetic driving force generated by the supply of the driving current from the power supply portion controlled by the not illustrated control unit to the coil 28 of the focus lens structure 11. The movement operation of this focus lens structure 11 is counted at the control unit by detecting the change of the magnetic flux density by the MR magnet 29 as the change of the resistance value by the focus lens position detection sensor 36 In the lens mirror cylinder 1, the supply of the current from the power supply portion is controlled by the output from the control unit, the position control of the focus lens structure 11 in the rear mirror cylinder 1 in the light axis direction is carried out, and the focal adjustment is carried out.

As mentioned above, in the lens mirror cylinder 1, the mirror cylinder 2 is constructed by integrally combining that the front mirror cylinder 3 and the rear mirror cylinder 4 via the intermediate frame 9. Further, in the rear mirror cylinder 4, the focus lens structure 11 and the focus lens driving means 14 moving this focus lens structure 11 in the light axis direction are accommodated. Further, the focus lens driving means 14 is constituted by a linear motor comprising four magnetic circuits arranged at the upper, lower, left, and right positions so as to surround the lens holder while sandwiching the light axis therebetween. The lens mirror cylinder 1 is constituted so as to exhibit a laterally long rectangular cylindrical shape by a characteristic as shown in FIG. 9 in such a manner that space efficiency of the upper and lower spaces in which the yokes do not exist is achieved and the rear mirror cylinder 4 is kept low with respect to the height direction.

In the lens mirror cylinder 1, the stepping motor 18 of the zoom lens driving unit 7 and the drive control unit 25 of the diaphragm unit 8 to be positioned on the outside of the mirror cylinder 2 as mentioned above are arranged in the upper space of the rear mirror cylinder 4 by which space efficiency is achieved. Accordingly, the lens mirror cylinder 1 is constructed so as to exhibit a substantially square shape as a whole having a small unevenness in the outward portion when seen from the front surface as shown in FIG. 8 and FIG. 10. Since the lens mirror cylinder 1 has such an outer shape, it improves the mounting efficiency when installed in the video camera body and, at the same time, enables arrangement at any position.

Note that, in the lens mirror cylinder 1, the yokes 30 and 31 constituting the focus lens driving means 14 assembled inside the rear mirror cylinder 4 were arranged on the left and right and space efficiency in the vertical direction of the rear mirror cylinder 4 was achieved, but of course they are sometimes assembled in a state where the entire mirror cylinder is inclined by 90° so as to secure the space in the horizontal direction according to certain methods of the video camera body.

Figure 12:
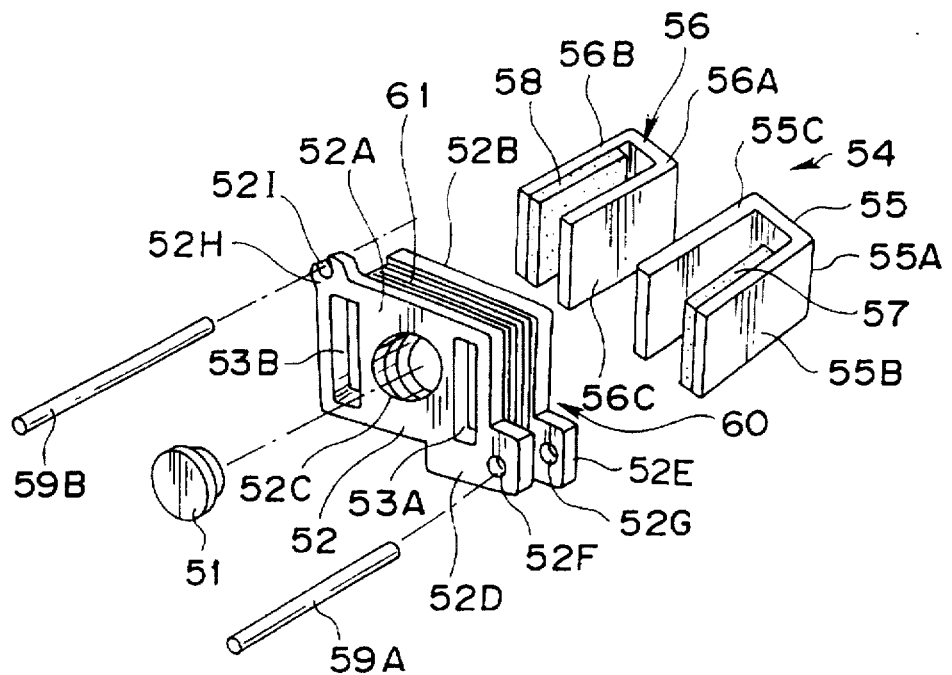
FIG. 12 is a broken down perspective view of the principal parts explaining the lens driving device driving the movable lens body when provided in the mirror cylinder shown as the second embodiment of the present invention.
Figure 13:
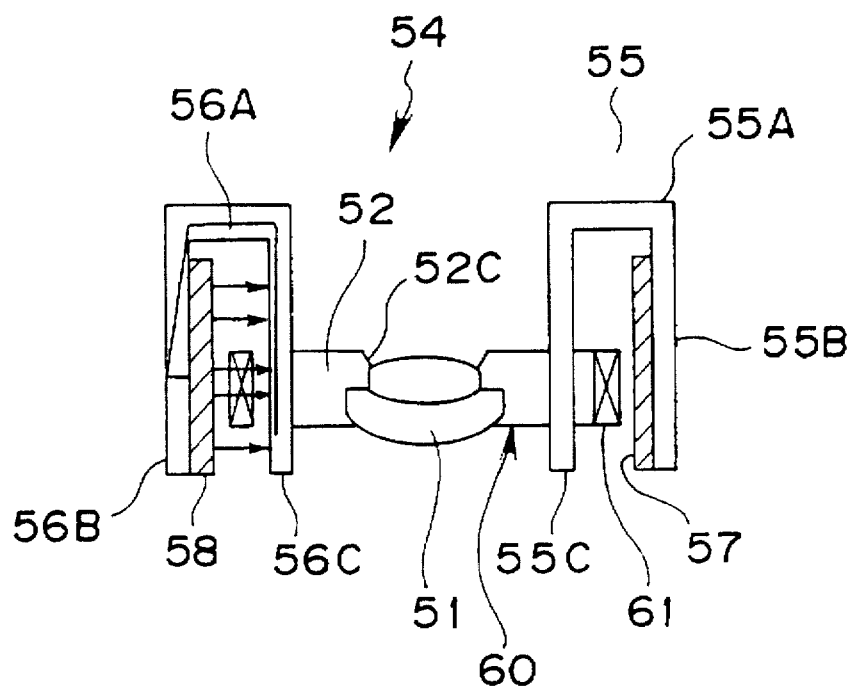
FIG. 13 is a plan view of the same lens driving device.
Figure 14:
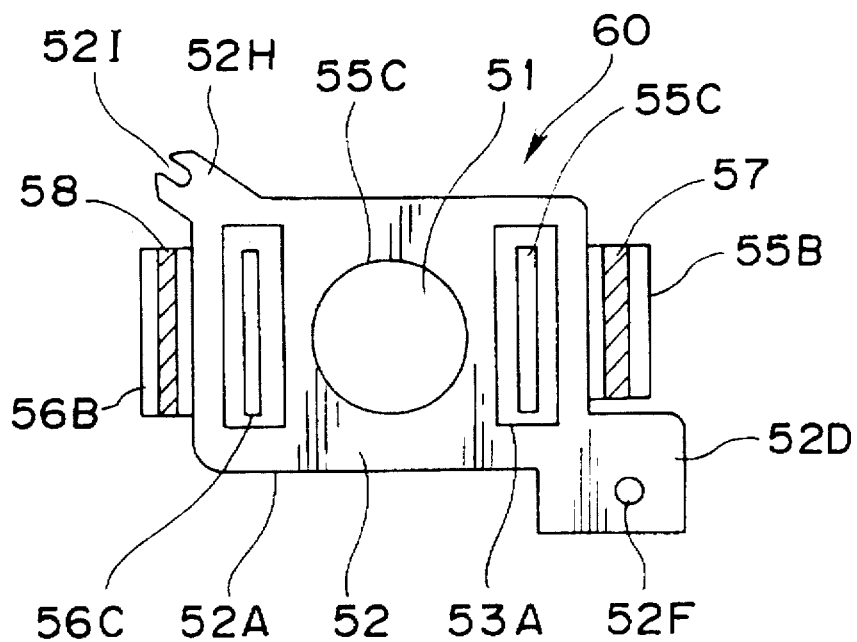
FIG. 14 is a front view of the same lens driving device.

FIGS. 12 through 14 show the lens driving device 50 of the movable lens 51 which is moved inside a not illustrated mirror cylinder by using a lens driving linear motor comprising four magnetic circuits arranged at the upper, lower, left, and right positions so as to surround the lens holder while sandwiching the light axis therebetween similar to the focus lens driving means 14 provided in the lens mirror cylinder 1 of the above embodiment. The lens driving device 50 a movable lens structure 60 comprised by integral formation of a lens holder 52 in which the movable lens 51 is assembled and a coil bobbin 61 formed by winding the coil wire; and a fixed portion 54 comprising a pair of left and right U-shaped yokes 55 and 56 and magnets 57 and 58 joined and fixed to these yokes and 56, respectively.

In the lens holder 52, flange-like boards 52A and 52B are formed on both sides of the square cylinder portion, around the outer circumferential portion of which the coil wire is wound, and a lens hole 52C in which the movable lens 51 is installed is disposed at the center. In the board 52A and the board 52B, bearings 52D and 52E in which shaft holes 52F and 52G are formed are integrally formed while being positioned at one corner and bringing the axial lines into coincidence with each other. In the forward board 52A, the bearing 52H having a shaft hole 52I is integrally formed at the opposite corner. In the lens holder yoke holes 53A and 53B constituted as rectangular holes in the height direction sandwiching the lens hole 52C therebetween are formed penetrating between the board 52A and the board 52B.

The movable lens structure 60 acts also as a coil bobbin 61 by winding the coil wire around the outer periphery of the square cylinder of the lens holder 52. The movable lens structure 60 adopts a constitution where the lens holder 52 and the coil bobbin 61 are integrally formed, whereby the constitution is simplified and, at the same time, the reduction of weight is achieved. Further, the movable lens structure 60 is moveably supported in the mirror cylinder in the light axis direction by the penetration of a pair of guide shafts 59A and 59B supported by the not illustrated mirror cylinder into the shaft holes 52F and 52G and shaft hole 52I.

With the lens driving device 50, the coil bobbin 61 of the movable lens structure 60 is combined while crossing the magnetic circuit of the fixed portion 54, and the movable lens structure 60 is moved by the magnetic driving force of the light axis direction generated by supplying the current to this coil bobbin 61. The yokes 55 and 56 constituting the fixed portion 54 are formed exhibiting a squared U-shape as a whole and comprise a pair of outside yoke pieces 55B and 55C and inside yoke pieces 56B and 56C respectively forwardly bent from both sides of the bases 55A and 56A in the height direction while facing parallel to each other.

The interval between the outside yoke piece 55B and the inside yoke piece 55C and between the outside yoke piece 56B and the inside yoke piece 56C is slightly larger than the thickness dimension of the coil bobbin portion 61 of the movable lens structure 60 and has a sectional shape slightly smaller than the dimension of the opening of the yoke holes 53A and 53B. Further, the yoke pieces 55B and 55C and the yoke pieces 56B and 56C have a length long enough for the range of movement of the movable lens structure 60.

The magnets 57 and 58 exhibit a thin plate-like shape as a whole and are joined and fixed to the inner surface of the outside yoke pieces 55B and 56B of the yokes 55 and 56 over almost the entire area of the axial direction while being in close contact with the outer periphery of the coil bobbin 61. Note that, for these magnets 57 and 58, use is made of a magnet having a large magnetic force by for example slightly increasing the thickness dimension so as to make the magnetic driving force almost equivalent to that of the linear motor comprising the four magnetic circuits arranged at the upper, lower, left, and right positions so as to surround the lens holder while sandwiching the light axis therebetween to act.

The bases 55A and 56B of the yokes 55 and 56 constituting the fixed portion 54 are attached to the not illustrated mirror cylinder. In these yokes 55 and 56, in a state where the movable lens structure 60 is supported by the guide shafts 59A and 59B, the inside yoke pieces 55C and 56C are penetrated through the yoke holes 53A and 53B formed in the lens holder 52 and, at the same time, the outside yoke pieces 55B and 56B are extended in close contact with the outer periphery of the coil bobbin obtained by winding the coil wire.

According to the lens driving device 50 constructed as described above, the movable lens structure 60 and the fixed portion 54 assembled in the mirror cylinder constitute the right side closed magnetic path of the outside yoke piece 55B—magnet 57—inside yoke piece 55C—base 55A—outside yoke piece 55B on the yoke 55 side. Similarly, the movable lens structure 60 and the fixed portion 54 constitute the left side closed magnetic path of the outside yoke piece 56B—magnet 58—inside yoke piece 56C—base 56A—outside yoke piece 56B on the yoke 68 side.

The movable lens structure 60 generates a magnetic flux in accordance with the direction of this driving current and makes the same act upon the closed magnetic path by blocking these closed magnetic paths by the coil bobbin 61 and, at the same time, the supply of the driving current. The movable lens structure 60 is supported by the guide shafts 59A and 59B by the magnetic driving force generated between the closed magnetic path of the fixed portion 54 and the coil bobbin 61 and moves in the mirror cylinder in the light axis direction.

According to the lens driving device 50, the fixed portion 54 is fixed in parallel to the surface on which the mirror cylinder is arranged, but it is also possible to obliquely form the yoke holes 53A and 53B with respect to the movement direction of for example the movable lens structure 60 and fix the fixed portion 54 to the mirror cylinder in a state where the yokes 55 and 56 constituting the fixed portion 54 are inclined with respect to the light axis direction corresponding to these yoke holes 53A and 53B.

Further, the lens drive device 50 is constructed by joining and fixing the magnets 57 and 58 to the inner surfaces of the yoke pieces 55B and 55C and the yoke pieces 56B and 56C and the outside yoke pieces 55B and 56B of the yokes 55 and 56 have a length in the light axis direction long enough for the range of movement of the movable lens structure 60, but of course it is also possible to constitute the same so that the length of the coil bobbin 61 of the movable lens structure 60 side in the light axis direction is set longer.

Further, of course, it is also possible to constitute the lens driving device so that the magnet is joined and fixed to the movable lens structure 60 side and, at the same time, the coil portion is disposed on the yoke 55 and 56 side.

Furthermore, in the above first embodiment, a lens mirror cylinder 1 provided with an auto-focus mechanism which is mounted in the video camera and automatically performs the focusing with respect to the photographic object and a motorized zoom mechanism performing the change of magnification was shown, but the present invention is not limited to such a lens mirror cylinder for a video camera. The present invention can be adopted also for various types of lens mirror cylinders supporting a movable lens structure in a mirror cylinder by a guide means so that it can freely move and, at the same time, providing a lens driving means which drives this movable lens structure to move, for example, a lens mirror cylinder for a still camera etc., and further it can be applied also to a so-called collapsible mount type lens mirror cylinder in which the rear mirror cylinder can be freely inserted to or removed from the front mirror cylinder.

As explained in detail above, for the lens mirror cylinder according to the present invention, for constructing the second lens driving means moving the second movable lens structure in the light axis direction with a linear motor comprising four magnetic circuits arranged at the upper, lower, left, and right positions so as to surround the lens holder while sandwiching the light axis therebetween, in which a pair of yokes are arranged on both sides of the coil, space efficiency of the portion orthogonal to the yoke arrangement portion is achieved. In the lens mirror cylinder, the first lens driving means and/or diaphragm unit is attached to the mirror cylinder by positioning the drive source of the first lens driving means driving the first movable lens structure to move in the light axis direction and/or the drive control unit of the diaphragm unit controlling the lens diameter in this space given a high efficiency, whereby the lens mirror cylinder exhibits a shape not having a projection in the outer periphery as a whole so that the constituent members are assembled within the range of the maximum outer diameter of the mirror cylinder, the space efficiency of the attachment portion of the main apparatus to be mounted is improved, and a reduction of size is achieved.

Further, by the lens mirror cylinder according to the present invention, the lens driving means moving the movable lens structure in the light axis direction is constituted by a linear motor comprising four magnetic circuits arranged at the upper, lower, left, and right positions so as to surround the lens holder while sandwiching the light axis therebetween in which a pair of yokes are arranged on both sides of the coil, whereby the enhancement of efficiency of the space of the portion orthogonal to the yoke arrangement portion is achieved and a reduction of size and a reduction of weight are achieved.

What is claimed is:

1. A lens mirror cylinder comprising:
   a mirror cylinder provided with a lens guide means in a light axis direction;
   a first movable lens structure comprising a first lens holder in which a first movable lens is installed and which is supported inside said mirror cylinder by the lens guide means, said first movable lens structure being freely movable in the light axis direction;
   a second movable lens structure comprising a second lens holder in which a second movable lens is installed and which is supported inside said mirror cylinder by the lens guide means, said second movable lens structure being freely movable in the light axis direction;

a first lens driving means which has a drive source and a lens driving member connected to the first movable lens structure which is driven by the drive source to move the first movable lens structure in the light axis direction, said first lens driving means being installed in the mirror cylinder;

a diaphragm unit disposed in the mirror cylinder which comprises a diaphragm body with an adjustable aperture and a drive control unit driving this diaphragm body to control said aperture and which is installed in the mirror cylinder; and a second lens driving means comprising a linear motor comprised by a coil, a yoke comprised of an inside yoke piece penetrating through a center hole of said coil, an outside yoke piece extending to the outer periphery of the coil, and a base connecting base ends of said inside yoke piece and said outside yoke piece, and a magnet forming a closed magnetic path between said yoke pieces and the base, which is arranged inside the mirror cylinder, and which drives the second movable lens structure to move in the light axis direction, the second lens driving means further comprising a pair of yokes facing each other on two sides of the light axis while sandwiching the coil therebetween and, at the same time, the first lens driving means and the diaphragm unit being installed in the mirror cylinder while positioning the drive source and the drive control unit at positions orthogonal to the positions of arrangement of these yokes.

2. A lens mirror cylinder according to claim 1, wherein the linear motor constituting said second lens driving means is constituted by integrally forming said coil in the second lens holder.

3. A lens mirror cylinder according to claim 1, wherein the linear motor constituting said second lens driving means is constituted by a coil wound around said second lens holder, which has a rectangular shape.

4. A lens mirror cylinder according to claim 3, wherein the diaphragm unit and/or first lens driving means are constituted while being arranged on the surface of said second rectangular lens holder on which a pair of yokes is not arranged.

5. A lens mirror cylinder according to claim 1, wherein electrical connection of the diaphragm unit and/or first lens driving means with the main apparatus provided with the drive control unit and/or drive source and the lens mirror cylinder is carried out by a flexible cable which is directly soldered.

6. A lens mirror cylinder according to claim 1, wherein a support rib supporting the outer periphery of the drive source of the first lens driving means and/or the drive control unit of the diaphragm unit is integrally formed in the mirror cylinder.

7. A lens mirror cylinder according to claim 1, wherein the first movable lens structure is a zoom lens structure, and the second movable lens structure is a focus lens structure.

8. A lens mirror cylinder according to claim 1, wherein the first and second movable lenses are each a plurality of lenses.

9. A lens mirror cylinder comprising:

a mirror cylinder provided with a lens guide means in a light axis direction;

a first movable lens structure comprising a first lens holder in which a first movable lens is installed and which is supported inside said mirror cylinder by the lens guide means, said first movable lens structure being freely movable in the light axis direction;

a second movable lens structure comprising a second lens holder in which a second movable lens is installed and which is supported inside said mirror cylinder by the lens guide means, said second movable lens structure being freely movable in the light axis direction;

a first lens driving means which has a drive source and a lens driving member connected to the first movable lens structure which is driven by the drive source to move the first movable lens structure in the light axis direction, said first lens driving means being installed in the mirror cylinder;

a diaphragm unit disposed in the mirror cylinder which comprises a diaphragm body with an adjustable aperture and a drive control unit driving this diaphragm body to control said aperture and which is installed in the mirror cylinder; and a second lens driving means which is constituted by arranging a plurality of magnetic circuits on an outer periphery of the second movable lens structure.

10. A lens mirror cylinder according to claim 9, wherein at least one of said magnetic circuits in said second lens driving means comprises a coil, a yoke composed of an inside yoke piece penetrating through a center hole of said coil, an outside yoke piece extending to the outer periphery of the coil, and a base connecting base ends of said inside yoke piece and said outside yoke piece, and a magnet forming a closed magnetic path between said yoke pieces of said yoke and the base.

11. A lens mirror cylinder according to claim 9, wherein said second lens driving means comprises a linear motor comprising a coil wound around the second lens holder and a pair of yokes each of which having an arm that extends through said coil, wherein said yokes are positioned facing each other over the light axis.

12. A lens mirror cylinder according to claim 9, wherein the first movable lens structure is a zoom lens structure, and the second movable lens structure is a focus lens structure.

13. A lens mirror cylinder comprising:

a mirror cylinder;

a first movable lens structure comprising a first lens holder in which a zoom lens is installed, said first movable lens structure being supported inside said mirror cylinder and being movable inside said cylinder;

a second movable lens structure comprising a second lens holder in which a focus lens is installed, said second movable lens structure being supported inside said mirror cylinder and being movable inside said cylinder;

a first lens driver installed in said mirror cylinder which moves said first movable lens structure;

a second lens driver installed in said mirror cylinder which moves said second movable lens structure a diaphragm installed in said mirror cylinder having an adjustable aperture; and a diaphragm drive control unit installed in said mirror cylinder which drives said diaphragm to control said aperture.

14. A mirror cylinder as claimed in claim 13, wherein said diaphragm is disposed in said mirror cylinder between said first and second movable lens structures.

15. A mirror cylinder as claimed in claim 13, wherein said mirror cylinder comprises:

a first cylinder section in which is disposed said first movable lens structure;

a second cylinder section in which is disposed said second movable lens structure; and an intermediate frame joining said first and second cylinder sections.

16. A mirror cylinder as claimed in claim 15, wherein said first cylinder section has a cylindrical shape, and said second cylinder section has a squared cylindrical shape.

17. A mirror cylinder as claimed in claim 15, wherein said diaphragm drive control unit is supported by said intermediate frame.

18. A mirror cylinder as claimed in claim 15, wherein said first movable lens structure is supported in said first cylinder section by a first guide, wherein said first movable lens structure moves along said first guide.

19. A mirror cylinder as claimed in claim 18, wherein said second movable lens structure is supported in said second cylinder section by a second guide, wherein said second movable lens structure moves along said second guide.

20. A mirror cylinder as claimed in claim 13, wherein said zoom lens comprises a plurality of zoom lenses.

21. A mirror cylinder as claimed in claim 13, wherein said focus lens comprises a plurality of focus lenses.

* * * * *